(12) United States Patent
Uhrich et al.

(10) Patent No.: US 10,487,714 B2
(45) Date of Patent: Nov. 26, 2019

(54) METHOD AND SYSTEM FOR EXHAUST GAS HEAT RECOVERY

(71) Applicant: Ford Global Technologies, LLC, Dearborn, MI (US)

(72) Inventors: Michael James Uhrich, West Bloomfield, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 15/634,887

(22) Filed: Jun. 27, 2017

(65) Prior Publication Data
US 2017/0292431 A1 Oct. 12, 2017

Related U.S. Application Data

(63) Continuation of application No. 15/010,382, filed on Jan. 29, 2016, now Pat. No. 9,689,295.

(51) Int. Cl.
*F01N 9/00* (2006.01)
*F02M 26/22* (2016.01)
(Continued)

(52) U.S. Cl.
CPC ............... *F01N 9/00* (2013.01); *B60H 1/04* (2013.01); *F01N 1/00* (2013.01); *F01N 3/0205* (2013.01); *F01N 3/10* (2013.01); *F01N 5/02* (2013.01); *F01N 11/005* (2013.01); *F02D 41/005* (2013.01); *F02D 41/0007* (2013.01); *F02D 41/0052* (2013.01); *F02D 41/064* (2013.01); *F02D 41/144* (2013.01); *F02D 41/1446* (2013.01); *F02D 41/1448* (2013.01); *F02D 41/1454* (2013.01); *F02M 26/22* (2016.02);
(Continued)

(58) Field of Classification Search
CPC .. F02M 26/22; F02M 26/33; F02M 2026/001; F01N 5/02; F01N 11/005
See application file for complete search history.

(56) References Cited

U.S. PATENT DOCUMENTS 4,061,186 A 12/1977 Ljung
4,450,932 A 5/1984 Khosropour et al.
(Continued)

FOREIGN PATENT DOCUMENTS

FR 2924169 A1 * 5/2009 ............. F02M 26/16
FR 2924169 A1 5/2009
(Continued)

OTHER PUBLICATIONS

FR 2924169, Machine Translation, Translated on Apr. 8, 2019.*
(Continued)

*Primary Examiner* — Patrick D Maines
(74) *Attorney, Agent, or Firm* — Geoffrey Brumbaugh; McCoy Russell LLP

(57) ABSTRACT

Methods and systems are provided for exhaust gas heat recovery at an exhaust gas heat exchanger. Exhaust gas may flow in both directions through an exhaust bypass passage and the heat exchanger coupled to the bypass passage. Hot or cold EGR may be delivered from the exhaust passage to the engine intake manifold and heat from the exhaust gas may be recovered at the heat exchanger.

14 Claims, 10 Drawing Sheets

(51) Int. Cl.

| | | |
|---|---|---|
| F02M 26/33 | (2016.01) | |
| F01N 5/02 | (2006.01) | |
| F01N 11/00 | (2006.01) | |
| F02M 26/52 | (2016.01) | |
| F02M 26/65 | (2016.01) | |
| B60H 1/04 | (2006.01) | |
| F01N 1/00 | (2006.01) | |
| F01N 3/02 | (2006.01) | |
| F01N 3/10 | (2006.01) | |
| F02D 41/00 | (2006.01) | |
| F02D 41/06 | (2006.01) | |
| F02D 41/14 | (2006.01) | |
| F02M 26/00 | (2016.01) | |

(52) U.S. Cl.
CPC ............ *F02M 26/33* (2016.02); *F02M 26/52* (2016.02); *F02M 26/65* (2016.02); *F01N 2240/02* (2013.01); *F01N 2900/08* (2013.01); *F02D 2041/1472* (2013.01); *F02D 2200/021* (2013.01); *F02M 2026/001* (2016.02); *Y02T 10/144* (2013.01); *Y02T 10/16* (2013.01); *Y02T 10/47* (2013.01)

(56) References Cited

U.S. PATENT DOCUMENTS

| | | |
|---|---|---|
| 6,141,961 A | 11/2000 | Rinckel |
| 7,322,193 B2 | 1/2008 | Bering et al. |
| 7,987,836 B2 | 8/2011 | Kurtz et al. |
| 8,209,662 B2 | 6/2012 | Nathan et al. |
| 8,250,866 B2 | 8/2012 | Styles et al. |
| 8,375,701 B2 | 2/2013 | Lupescu et al. |
| 8,413,433 B2 | 4/2013 | Lupescu |
| 8,490,383 B2 | 7/2013 | Laermann et al. |
| 8,615,983 B2 | 12/2013 | Knafl et al. |
| 8,616,187 B2 | 12/2013 | Yamazaki et al. |
| 8,635,852 B2 | 1/2014 | Lupescu et al. |
| 8,661,815 B2 | 3/2014 | Ulrey et al. |
| 2009/0020260 A1 | 1/2009 | Miyagawa |
| 2009/0049832 A1 | 2/2009 | Hase |
| 2009/0223219 A1* | 9/2009 | Joergl ................ F02B 29/0406 60/602 |
| 2011/0232362 A1 | 9/2011 | Thiagarajan et al. |
| 2011/0308503 A1* | 12/2011 | Yasui .................... F02D 41/005 123/568.21 |
| 2012/0216763 A1 | 8/2012 | Barnes |
| 2012/0260897 A1 | 10/2012 | Hayman et al. |
| 2013/0019847 A1 | 1/2013 | Nelson et al. |
| 2013/0031967 A1 | 2/2013 | Ichimasa |
| 2013/0037235 A1 | 2/2013 | Sakabe et al. |
| 2013/0220288 A1 | 8/2013 | Klingbeil |
| 2014/0109884 A1* | 4/2014 | Hornback ................ F02D 9/04 123/568.12 |
| 2016/0115910 A1* | 4/2016 | Bramson ................ F02M 26/35 123/568.12 |

FOREIGN PATENT DOCUMENTS

| | | | |
|---|---|---|---|
| JP | 2011247174 A | * | 12/2011 |
| JP | 2011247174 A | | 12/2011 |
| JP | 2013072378 A | * | 4/2013 |
| JP | 2013072378 A | | 4/2013 |
| WO | 2009068504 A1 | | 6/2009 |

OTHER PUBLICATIONS

Styles, D. et al., "Method and System for Exhaust Gas Heat Recovery," U.S. Appl. No. 15/010,537, filed Jan. 29, 2016, 72 pages.

Uhrich, M. et al., "Exhaust Heat Recovery and Hydrocarbon Trapping," U.S. Appl. No. 15/010,688, filed Jan. 29, 2016, 53 pages.

* cited by examiner

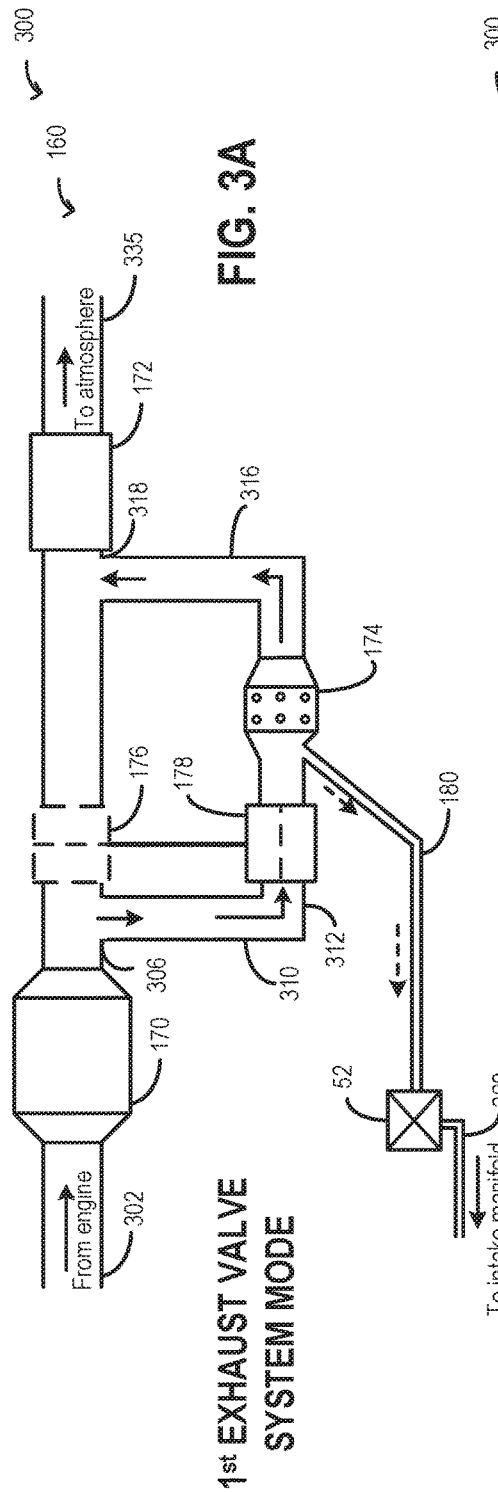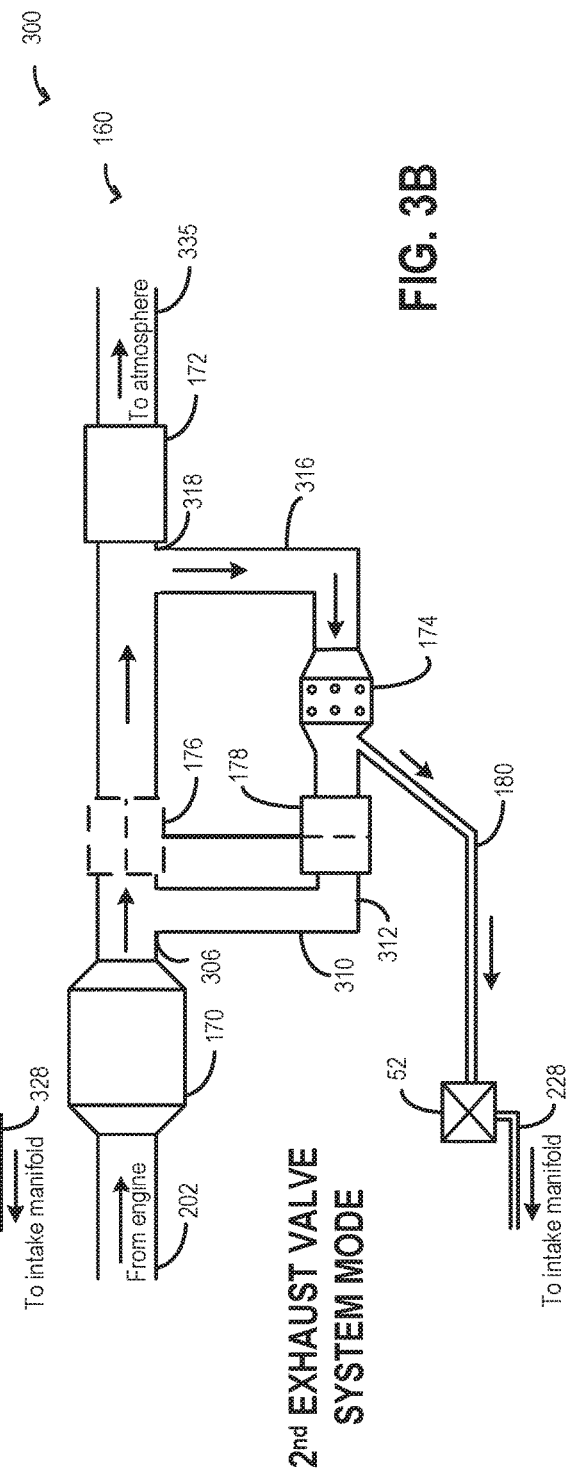

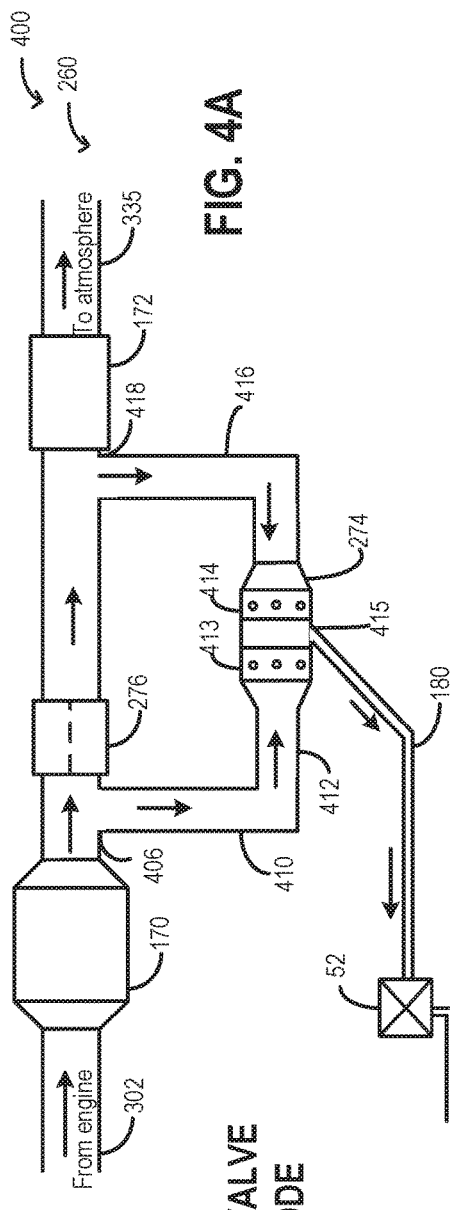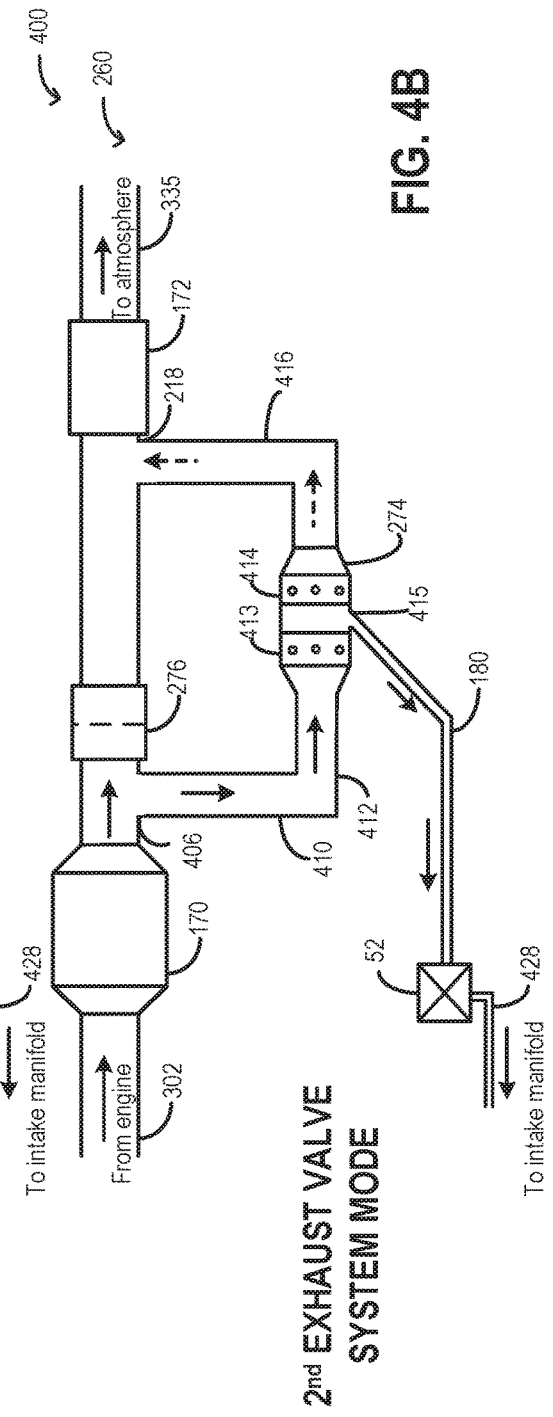
FIG. 4A — 1st EXHAUST VALVE SYSTEM MODE
FIG. 4B — 2nd EXHAUST VALVE SYSTEM MODE

FIG. 6

| Engine operating mode | EGR valve position | Valve system mode | Valve_1 (exhaust passage) position | Valve_2 (bypass passage) position | Direction of flow through heat exchanger |
|---|---|---|---|---|---|
| 1 – Cold start | Closed | 1st | Closed | Open | Left to right |
| 2 – EGR not required | Closed | 1st | Closed | Open | Left to Right |
| 3 – Hot EGR required | Open | 1st | Closed | Open | Does not flow through heat exchanger |
| 4 – Cold EGR required | Open | 2nd | Open | Closed | Right to Left |

FIG. 9

| Engine operating mode | EGR valve position | Exhaust passage valve position | Section of heat exchange system in use | Direction of flow through heat exchange system |
|---|---|---|---|---|
| 1 – Cold EGR required | Open | Open | Both | Both (opposite) |
| 2 – warm EGR required | Open | Closed | Left | Left to Right |
| 3 – EGR not required | Closed | Closed | Both | Left to Right |

METHOD AND SYSTEM FOR EXHAUST GAS HEAT RECOVERY

CROSS REFERENCE TO RELATED APPLICATION

The present application is a continuation of U.S. patent application Ser. No. 15/010,382, entitled "METHOD AND SYSTEM FOR EXHAUST GAS HEAT RECOVERY," filed on Jan. 29, 2016, now U.S. Pat. No. 9,689,295. The entire contents of the above-referenced application are hereby incorporated by reference in its entirety for all purposes.

FIELD

The present description relates generally to methods and systems for exhaust gas heat recovery at an exhaust gas heat exchanger.

BACKGROUND/SUMMARY

Engines may be configured with an exhaust heat recovery system for recovering heat of exhaust gas generated at an internal combustion engine. The heat is transferred from the hot exhaust gas to a coolant through an exhaust gas heat exchanger system. The heat from the coolant, circulated through the an exhaust gas heat exchanger, may be utilized for functions such as heating the cylinder head, and warming the passenger cabin, thereby improving engine efficiency. In hybrid electric vehicles, the recovery of exhaust heat improves fuel economy by enabling engine temperatures to be maintained longer, thereby allowing for a faster engine shut-off and extended use of the vehicle in an electric mode.

Exhaust heat may also be retrieved at an exhaust gas recirculation (EGR) cooler. An EGR cooler may be coupled to an EGR delivery system to bring down the temperature of recirculated exhaust gas before it is delivered to the intake manifold. EGR may be used to reduce exhaust NOx emissions. Further, EGR may be used to assist in the reduction of throttling losses at low loads, and to improve knock tolerance.

Various approaches are provided for exhaust heat recovery and EGR cooling. In one example, as shown in US 20120260897, Hayman et al. discloses an engine system wherein exhaust gas from a first group of cylinders is directed to an exhaust tailpipe. Exhaust gas from a second group of cylinders is directed to an intake manifold via an EGR passage. In addition, based on the EGR requirement of the engine, a portion of the exhaust from the second group of cylinders may be diverted to the exhaust tailpipe via a bypass passage. An EGR cooler coupled to the EGR passage is used to cool the exhaust gas prior to mixing of the EGR with combustion air and entry of the mixture into the intake manifold.

However, the inventors herein have recognized potential disadvantages with the above approaches. As one example, it may be difficult to coordinate EGR cooling with exhaust heat recovery. In particular, the heat recovered at the EGR cooler cannot be used for heating a cabin space. As a result, a distinct heat exchanger is required for cabin heating. Likewise, even if heat is extracted from exhaust gas at a heat exchanger, the cooled exhaust gas is not recirculated, resulting in the need for a distinct EGR cooler. The additional components add cost and complexity.

The inventors herein have identified an approach by which the issues described above may be at least partly addressed. One example method for an engine comprises: operating in a first mode with exhaust gas flowing through an exhaust bypass, and in a first direction through a heat exchanger coupled in the exhaust bypass, and then to an exhaust tailpipe; and operating in a second mode with exhaust flowing through an exhaust passage, then in a second, opposite direction through the heat exchanger, and then to the engine intake. In this way, EGR cooling and exhaust heat recovery can be provided via a common heat exchanger.

In one example, an engine system may be configured with a heat exchanger positioned downstream of a catalytic convertor in an exhaust bypass disposed parallel to a main exhaust passage. A pair of butterfly valves may be used to enable exhaust gas to be diverted into the bypass passage, and through the heat exchanger in one of two directions, a position of the valves adjusted based on engine operating parameters. For example, during conditions when EGR is not required, the valves may be adjusted to flow exhaust through the bypass passage in a first direction through the heat exchanger, and then on to the exhaust tailpipe. During the flow, exhaust heat is transferred to the heat exchanger, wherefrom the heat is transferred to a coolant circulating around the heat exchanger, the hot coolant then used for functions such as cabin heating. In comparison, when cooled EGR is required, the valves may be adjusted to flow exhaust gas through the bypass passage and across the heat exchanger in a second direction opposite to the first direction before the exhaust gas is recirculated to the engine intake via an EGR passage. The heat recovered at the heat exchanger during this flow is transferred to circulating coolant, and thereon the warmed coolant may be circulated back to the engine (such as when engine heating is required) and/or utilized for heating a passenger cabin of the vehicle (such as when cabin heating is requested). Alternatively, the extracted heat is transferred to the radiator for dissipation into the atmosphere. Further, during conditions when hot EGR is required, the valves may be adjusted so that a portion of the exhaust gas can be diverted to the bypass passage, and drawn into the EGR passage before passing through the heat exchanger.

In this way, the heating requirements of an engine system may be met using a single heat exchanger. By providing the functions of an EGR cooler and an exhaust gas heat exchanger via a single heat exchanger, cost and component reduction benefits are achieved without limiting the functionality or capability of either system. In addition, the specific configuration of a single heat exchanger in a bypass exhaust passage allows for a shorter EGR passage length, which reduces EGR transport delays. The technical effect of using a pair of butterfly valves to regulate the passage of exhaust gas through the bypass passage is that exhaust gas can be flowed in both directions across the heat exchanger. As such, this improves the heat transfer efficiency and reduces the requirement for long EGR passages. Overall, by improving the amount of waste heat that can be recovered from exhaust using fewer components, engine fuel economy and performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows an example embodiment of the exhaust bypass assembly of FIG. 1 operating in a first mode.

FIG. 3B shows an example embodiment of the exhaust bypass assembly of FIG. 1 operating in a second mode.

FIG. 4A shows an example embodiment of the exhaust bypass assembly of FIG. 2 operating in a first mode.

FIG. 4B shows an example embodiment of the exhaust bypass assembly of FIG. 2 operating in a second mode.

FIG. 6 shows a table illustrating the different modes of operation of the exhaust bypass assembly of FIG. 1.

FIG. 9 shows a table illustrating the different modes of operation of the exhaust bypass assembly system of FIG. 2.

DETAILED DESCRIPTION

Figure 1:
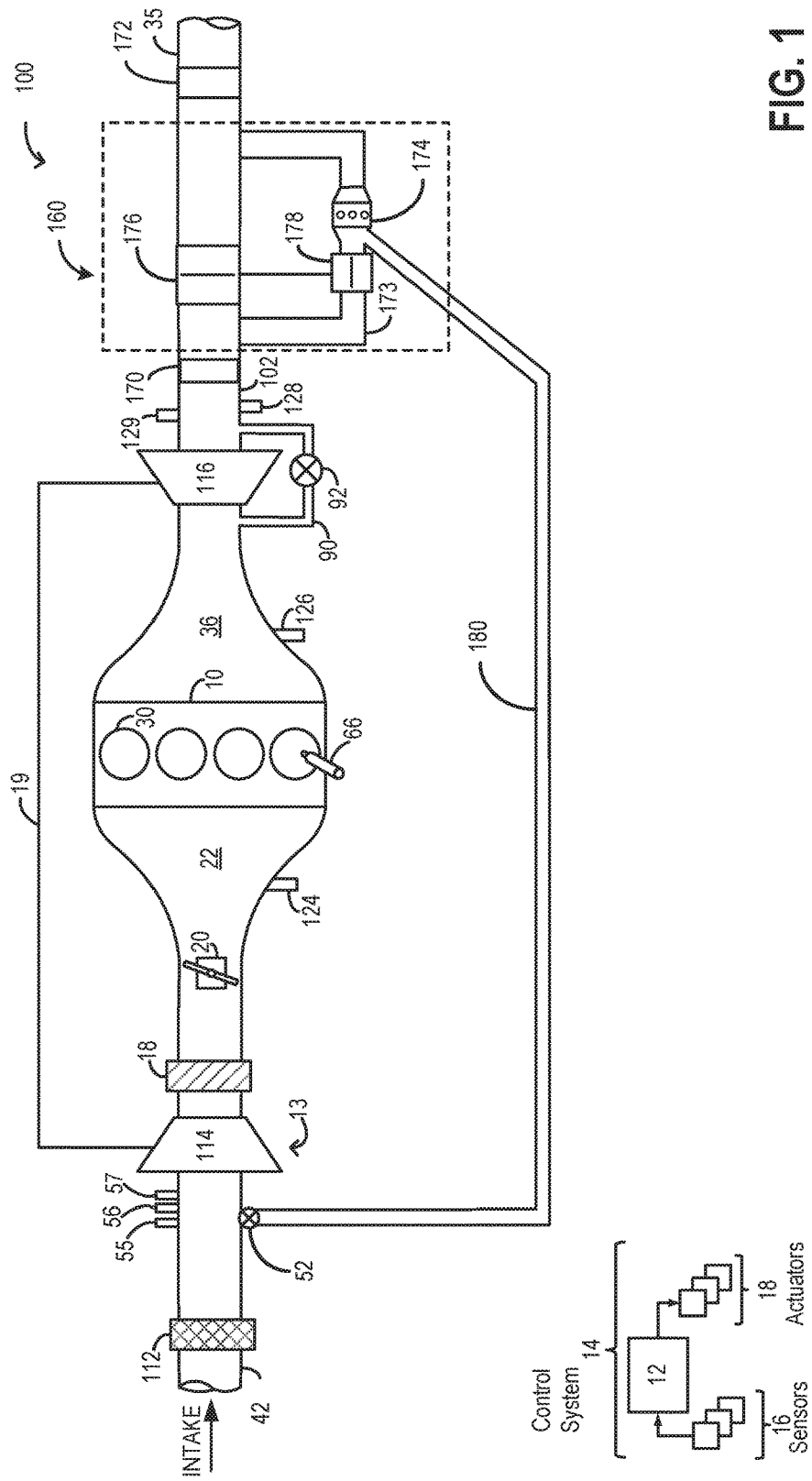
FIG. 1 shows an example embodiment of an engine system including an exhaust bypass assembly with a heat exchanger.
Figure 2:
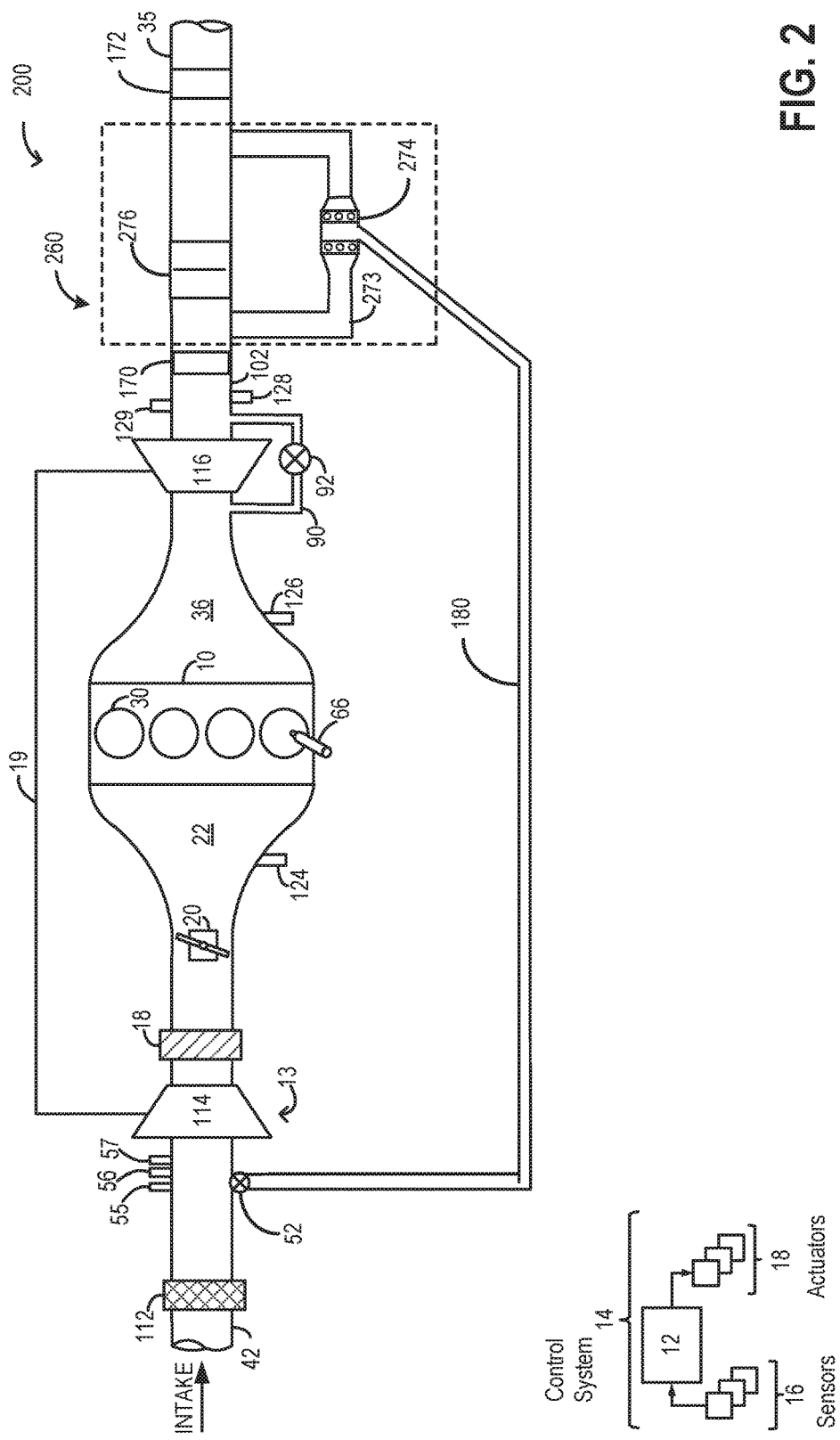
FIG. 2 shows an example embodiment of an engine system including an exhaust bypass assembly with a split heat exchanger.

The following description relates to systems and methods for improving exhaust heat recovery using a single heat exchanger/EGR cooler coupled in an exhaust bypass. Example engine systems comprising an exhaust bypass assembly are shown in FIGS. 1 and 2. In FIG. 1, a pair of valves are used to enable bidirectional flow of exhaust through the heat exchanger. In FIG. 2, a single valve is used to enable bidirectional flow of exhaust through one or more sections of a split heat exchanger. The different modes of operation of the systems of FIGS. 1-2 are elaborated with reference to FIGS. 3A-3B, 4A-4B, 6, and 7. An engine controller may be configured to perform a control routine, such as the example routines of FIGS. 5 and 8, to vary the position of the system valve(s) to thereby adjust exhaust flow through the heat exchanger in the systems of FIGS. 1 and 2, respectively. Example operations of the systems of FIGS. 1-2 are shown with reference to FIGS. 7 and 10 respectively.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled, through charge-air cooler (CAC) 18 to throttle valve 20. Throttle valve 20 is coupled to engine intake manifold 22. From the compressor, the compressed air charge flows through the charge-air cooler 18 and the throttle valve to the intake manifold. In the embodiment shown in FIG. 1A, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via main exhaust passage 102 after passing through a muffler 172. An exhaust bypass assembly 160 with a bypass passage 173 may be coupled to the main exhaust passage 102, downstream of the emission control device 170. The bypass passage 173 may extend from downstream of the emission control device 170 to upstream of muffler 172. The bypass passage 173 may be arranged parallel to the main exhaust passage 102. A heat exchanger 174 may be coupled to bypass passage 173 to cool the exhaust gas passing through the bypass passage 173. Exhaust gas recirculation (EGR) delivery passage 180 may be coupled to the exhaust bypass passage 173 at a location upstream of heat exchanger 174. From downstream of the emission control device 170, exhaust may flow towards muffler 172 via one or more of the main exhaust passage 102 and the bypass passage 173.

A pair of diverter valves 176 and 178 may be used to regulate the amount and direction of flow of exhaust gas through main exhaust passage 102 and bypass passage 173. In one example, diverter valves 176 and 178 may each be configured as butterfly valves (herein also referred to as butterfly valves 176 and 178), although other valve configurations may also be used. Further, depending on operating conditions such as engine temperature, a portion of the exhaust residuals may be diverted through bypass passage 173 and thereon to tailpipe 35 or to the inlet of compressor 114 via exhaust gas recirculation (EGR) valve 52 and EGR passage 180. Also based on engine operating conditions, a direction of exhaust gas flow through the bypass passage 173 and across the heat exchanger 174 may be varied. In this way, the configuration allows for bidirectional flow of exhaust gas through the heat exchanger. Opening of the pair of butterfly valves and the EGR valve 52 may be regulated to control the flow of exhaust though the bypass passage 173 and the heat exchanger 174. EGR valve 52 may be opened to admit a controlled amount of exhaust gas to the compressor inlet for desirable combustion and emissions control performance. EGR valve 52 may be configured as a continuously variable valve. In an alternate example, however, EGR valve 52 may be configured as an on/off valve.

By adjusting the position of the butterfly valves 176 and 178, and an opening of EGR valve 52, flow of exhaust gas through the heat exchanger can be varied. In one example, butterfly valve 176 may be closed while butterfly valve 178 is opened so that exhaust gas may flow from downstream of the emissions control device 170 into the bypass passage 173, across the heat exchanger 174 in a first direction and thereon to tailpipe 35. While flowing exhaust through the bypass passage 173 in the first direction, if requested, hot EGR may be drawn from upstream of the heat exchanger and delivered to the inlet of compressor 114 via the EGR delivery passage 180. Opening of EGR valve 52 may be regulated to control the amount of exhaust entering the EGR delivery passage compared to the amount of exhaust flowing across the heat exchanger 174 towards the tailpipe 35. In this way, hot LP-EGR may be optionally provided.

In another example, butterfly valve 176 may be opened while butterfly valve 178 is closed so that exhaust gas may flow through the main exhaust passage 35, via emission control device 170 and butterfly valve 176 and enter bypass passage 173 from upstream of the muffler 172. In this case, the exhaust may flow across the heat exchanger 174 in a second direction, opposite to the first direction, and thereon the cooled exhaust may enter the EGR delivery passage 180. In this way, cooled LP-EGR may be provided.

As the exhaust gas passes through the heat exchanger 174 in either direction, heat from the hot exhaust gas may be transferred to a coolant circulating through the heat exchanger 174. In one example, the heat exchanger 174 is a water-gas exchanger. Upon transfer of heat from the exhaust gas to the coolant, the warmed coolant may be circulated back to the engine (such as when engine heating is required) and/or through a heater core for heating a passenger cabin of the vehicle (such as when cabin heating is requested). Alternatively, when there are no heating demands, the warmed coolant may be flowed through a radiator for heat dissipation to the atmosphere.

In this way, engine system 10 may be adapted to provide external, low-pressure (LP) EGR by tapping exhaust gas from downstream of turbine 116, the EGR cooled upon passage through a heat exchanger used for EGR cooling and exhaust heat recovery. Detailed description of the operation and structure of exhaust bypass assembly 160 will be discussed with relation to FIGS. 3A-3B, 5, 6, and 7. In further embodiments, the engine system may include a high pressure EGR flow path wherein exhaust gas is drawn from upstream of turbine 116 and recirculated to the engine intake manifold, downstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity and air-fuel ratio sensors 55-57 coupled to the compressor inlet. In one example, air-fuel ratio sensor 57 is an oxygen sensor.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 100. The actuators 81 may include, for example, throttle 20, EGR valve 52, butterfly valves 176 and 178, wastegate 92, and fuel injector 66. The control system 14 may include a controller 12. The controller 12 may receive input data from the various sensors, process the input data, and trigger various actuators in response to the processed input data based on instruction or code programmed therein corresponding to one or more routines. For example, based on engine operating conditions and EGR requirements the controller 12 may regulate the opening of the butterfly valves 176 and 178 to direct exhaust gas in a first or a second direction through the heat exchanger. As another example, based on catalyst temperature inferred from exhaust temperature sensor 128, opening of EGR valve 52 may be adjusted to draw a desired amount of EGR from the exhaust bypass passage into the engine intake manifold. An example control routine is described with regard to FIG. 5.

An alternate embodiment of FIG. 1 is shown in FIG. 2 and elaborated below with reference to example engine system 200. All components of the engine system 200 may be identical to that of engine system 100 other than the exhaust bypass assembly 260. As elaborated below, exhaust bypass assembly 260 may be configured with a split heat exchanger and a single diverter valve. The different modes of operation of the exhaust bypass assembly of FIG. 2 are elaborated with reference to FIGS. 4A-4B.

FIG. 3A further elaborates the exhaust bypass assembly introduced in FIG. 1 and shows an example embodiment 300 of operating the exhaust bypass assembly of FIG. 1 in a first operating mode. In one example, assembly 300 is an embodiment of assembly 160 of FIG. 1 and therefore may share common features and/or configurations as those already described for bypass assembly 160. Exhaust bypass assembly 160 is fluidly coupled to exhaust passage 302 downstream of an emission control device 170. As discussed in relation to FIG. 1, one or more emission control devices 170 may include one or more exhaust after-treatment catalysts configured to catalytically treat the exhaust flow, and thereby reduce an amount of one or more substances in the exhaust flow.

Exhaust gas flowing from the engine passes through the emission control device 170 and reaches the exhaust bypass assembly 160 located further downstream along the exhaust passage 302. An inlet pipe 310 of the exhaust bypass assembly 160 is disposed on the exhaust passage 302 at junction 306 (downstream from emission control device 170). Butterfly valve 176 is coupled to the exhaust passage 302 downstream from the junction 306. The inlet pipe 310 leads to a bypass passage 312 which may be parallel to the exhaust passage 302. Butterfly valve 178 is coupled to the bypass passage 312. In one example, the two butterfly valves may be coupled to a common shaft, and the valves may be actuated together. Depending on the desired direction of exhaust flow through the exhaust bypass assembly, one of butterfly valves 176 and 178 may be in open position. In an alternate embodiment, the two butterfly valves may be actuated independently and may be opened simultaneously.

Downstream from the second butterfly valve 178, a heat exchanger may be coupled to the pipe 310. A coolant may be circulated through the heat exchanger 174 for effective cooling of the exhaust gas passing through it, before the gas either enters the EGR passage 180 or escapes to the atmosphere through tailpipe 335. Downstream from the second butterfly valve 178 and upstream from the heat exchanger 174, an inlet to the EGR passage 180 may be located on the bypass passage 312. Depending on engine requirements, it is possible to flow exhaust gas in both directions through the passage 312 and accordingly cooled or hot EGR may be delivered through the EGR passage 180 to the engine intake manifold. An EGR valve 52 may control the delivery of EGR from the exhaust passage 302 to the passage 328 leading to engine intake manifold. Upstream of the heat exchanger 174, the bypass passage 312 ends in an outlet pipe 316 leading back to the exhaust passage 302. The inlet 310 and outlet pipes 316 may be at right angles to the bypass passage 312 and the main exhaust passage 302. The outlet pipe 316 joins the exhaust passage 302 at a junction 318 located downstream from the junction 306 and first butterfly valve 176. Further downstream of junction 318, a muffler 172 may be coupled to the exhaust passage 302. After passing through the muffler 172 the exhaust gas may be released to the atmosphere through a tailpipe 335. By locating all components of the exhaust bypass assembly downstream of the emissions control device (including catalyst) 170, limitations due to catalyst warm-up are eliminated.

As such, the first operating mode represents a first setting of the butterfly valves 176 and 178 that enables exhaust flow control. In the first operating mode, the butterfly valve 176 (coupled to the main exhaust passage 302) may be in closed position and the butterfly valve 178 (coupled to the bypass passage 312) may be in open position. It will be appreciated that various functional modes of the engine system may be possible while operating the assembly in the first operating mode, such as by varying the opening of an EGR valve. When in the first operating mode, due to closing of the first butterfly valve 176, exhaust gas may not be able to flow through the exhaust passage 302 towards the tail pipe 335. The exhaust gas may flow into the exhaust bypass assembly though the inlet pipe 310, as shown by the bold arrows. The second butterfly valve 178 is in open state and the exhaust gas may pass through it and enter the bypass passage 312. Depending on EGR requirement the EGR valve may be in one of open and closed position. When the EGR valve is in closed position, exhaust gas may not enter the EGR passage 180 and may directly enter the heat exchanger 174 located further downstream on the bypass passage 312. In the first operating mode, the exhaust gas flows through the heat exchanger 174 in a first direction (from a first end of the heat exchanger proximal to the inlet pipe 310 to the second end of the heat exchanger 174 proximal to the outlet pipe 316). After passing through the heat exchanger 174, the cooled exhaust gas flows through the outlet pipe 316 and exits the exhaust bypass assembly. The exhaust gas re-enters the exhaust passage 302 at the junction 318 and flows downstream towards the muffler 172. After passing through the muffler 172, the exhaust gas exits to the atmosphere through the tailpipe 335.

The first operating mode can be selected when in one or more functional modes, such as a first functional mode where EGR is not required and a second where hot EGR is required for engine operations.

In the first functional mode, selected when EGR is not required for engine operation, the assembly may be operated in the first operating mode with the EGR valve 52 held closed. EGR may not be required when the engine temperature is below a threshold, the threshold based on a catalyst light-off temperature. In the first functional mode, the exhaust gas does not enter the EGR passage and flows downstream through the heat exchanger in the first direction. At the heat exchanger 174, the exhaust gas may be cooled and the heat from the exhaust gas may be transferred to a coolant circulating through the heat exchanger 174. The coolant with the heat recovered from the exhaust gas may be circulated back to the engine (under conditions when engine heating is required) and/or circulated through a heater core of the vehicle and thereafter the recovered heat may be utilized for functions such as warming the passenger cabin, thereby improving engine efficiency. Under circumstances when the heat recovered at the heat exchanger 174 is not required for heating vehicle components, the heat may be transferred to the radiator for dissipation. In the first functional mode, after passing through the heat exchanger 174, the cooled exhaust gas flows out of the exhaust bypass assembly and exits to the atmosphere through the tailpipe 335.

In the second functional mode, selected when engine temperature is above a threshold, hot EGR may be desired for engine operation and consequently the EGR valve 52 may be opened. Opening of the EGR valve may be adjusted based on the request for hot EGR, the opening increased as the request for hot EGR increases. The exhaust gas after passing through the emissions control device 170 may enter the bypass assembly though the inlet pipe 310. The entrance to the EGR passage 180 is located on the bypass passage 132 between the second butterfly valve 178 and the heat exchanger 174. Therefore, depending on opening of the EGR valve 52, a first amount of the hot exhaust gas may enter the EGR passage 180 before passing through the heat exchanger 174. After passing through the EGR valve 52, the exhaust gas may enter the EGR passage 180 and pass through the passage 328 leading to engine intake manifold to be delivered upstream of a compressor inlet. The remaining (second) amount of the exhaust gas that does not enter the EGR passage 180 may pass through the heat exchanger 174 (in first direction) and exit the exhaust bypass assembly. Thereafter, this second amount of the exhaust gas may pass through the muffler 172 and exit to the atmosphere through tailpipe 335. In this way, based on engine requirements, it is possible to deliver hot EGR from the exhaust passage 302 to the intake manifold through the exhaust bypass assembly.

FIG. 3B shows a schematic view 300 of an example embodiment of an exhaust bypass assembly 160. The features of the exhaust bypass assembly 160 is described in relation to FIG. 3A. In FIG. 3B a second operating mode of the exhaust bypass assembly 160 is discussed as compared to the operation mode discussed in FIG. 3A.

As such, the second operating mode represents a second setting of the butterfly valves 176 and 178 that enables exhaust flow control. In the second operating mode, the butterfly valve 176 (coupled to the main exhaust passage 302) may be in open position and the butterfly valve 178 (coupled to the bypass passage 312) may be in closed position. Similar to the first operating mode, various functional modes of the engine system may be possible while operating the assembly in the second operating mode, such as by varying the opening of an EGR valve.

When in the second operating mode, due to opening of the first butterfly valve 176 (and closing of second butterfly valve 178), exhaust gas may not enter the exhaust bypass assembly through the inlet pipe 310 but rather pass through the first butterfly valve 176 and continue downstream along the exhaust passage 302. As the exhaust gas reaches the junction 318, a first amount of the exhaust gas may enter the exhaust bypass assembly through the outlet pipe 316 (used as inlet in this mode), as shown by bold arrows. A second amount of the exhaust gas may continue downstream along the exhaust passage 302 and exit to the atmosphere through the tail pipe 335 after passing through the muffler 172. The first amount of exhaust gas entering the bypass assembly may be controlled by the opening of the EGR valve 52. The first amount of exhaust gas entering the exhaust bypass assembly may continue to flow through the bypass passage 312 and enter the heat exchanger 174. In the second mode, the exhaust gas flows through the heat exchanger in a second (opposite to the first) direction (from a second end of the heat exchanger proximal to the outlet pipe 316 to the first end of the heat exchanger 174 proximal to the inlet pipe 310). This first amount of exhaust gas may enter the EGR passage 180. Since the second butterfly valve 178 is closed, the exhaust gas may not pass through the bypass assembly and return to the exhaust passage 302 via the inlet pipe 310. The second operating mode can be selected when in one or more functional modes, such as a third functional mode where cold EGR is required for engine operations.

In the third functional mode, cooled EGR may be desired by the engine. EGR may be required when the engine temperature is above a threshold where the threshold may be based on a catalyst light-off temperature. To deliver EGR, the EGR valve 52 may be opened, opening of the EGR valve may be increased based on EGR demand. The cooled exhaust gas on exiting the heat exchanger 174 may enter the EGR passage 180. The exhaust gas may pass thorough the EGR valve 52 and the passage 228 to enter the engine intake manifold.

Heat from the exhaust gas may be transferred to a coolant circulating through the heat exchanger 174. As previously described (FIG. 3A), depending on demand, the recovered heat may be transferred to the heater core for further utilization. When the engine temperature and vehicle cabin temperature is high, heat may be transferred from the heat exchanger 174 to a coolant circulating through a radiator, and heat is dissipated from the radiator to atmosphere.

In this way cooled EGR may be delivered to the intake manifold after passing through the heat exchanger 174. EGR travel length from the exhaust passage to the intake manifold is short and therefore the latency of EGR delivered is low. In this way, exhaust gas may flow through the heat exchanger in both directions depending on EGR requirement and the heat recovered at the heat exchanger may be utilized in other vehicle operations.

Selecting between the first (FIG. 3A) and second operating mode (FIG. 3B) may be based on engine temperature. For example, when the engine temperature is below a threshold, EGR may not be desired by the engine and consequently the exhaust bypass assembly may be operated in the first mode. In another example, when the engine temperature is above a threshold, cold EGR may be desired by the engine and consequently the exhaust bypass assembly may be operated in the second mode. In this way the functions of an EGR cooler and an exhaust gas heat exchanger may be carried out via a single heat exchanger.

In an alternate embodiment, the two butterfly valves 176 and 178 may be actuated independently. During high load conditions, both the butterfly valves may be maintained in open position to allow exhaust gas to flow concurrently through the main exhaust passage 302 and the bypass passage 312 towards the tailpipe 335. In this way heat may be extracted (at the heat exchanger 174) from a part of the exhaust gas but during high load conditions, due to high back pressure, a large amount exhaust gas may directly exit to atmosphere via the tailpipe 335 without entering the exhaust bypass assembly, thereby preventing coolant boil in the heat exchanger 174.

Moving on to FIG. 2, example engine system 200 is an alternate embodiment of engine system 100 as shown in FIG. 1. Components previously introduced in FIG. 1 are numbered similarly and not reintroduced. Similar to the embodiment of FIG. 1, engine system 200 of FIG. 2 may further include control system 14 for controlling engine operations. As seen in FIG. 2, engine system 200 includes an exhaust bypass assembly 260 with a bypass passage 273 coupled to exhaust passage 35, downstream of emission control device 170. In this assembly, a single diverter valve 276 may be provided to regulate the direction of exhaust flow through the bypass passage. In one example, diverter valve 276 may be configured as a butterfly valve (herein also referred to as butterfly valve 276), although other valve configurations may also be used. By using a single butterfly valve, thermal mass of the exhaust bypass assembly may be reduced, thereby improving heat recovery from the exhaust gas (by a coolant) at the heat exchanger 274. Depending on operating conditions, a portion of the exhaust residuals may be diverted through bypass passage 273 and EGR valve 52 to EGR passage 180 and the inlet of compressor 114. The bypass passage is fitted with a split heat exchanger 274, with two or more sections for cooling exhaust gas. The first section of the heat exchanger and the second section of the heat exchanger may be symmetrically sized. In an alternate embodiment, the heat exchanger may be asymmetrically sized wherein the first section of the heat exchanger is larger than the second section of the heat exchanger. Alternatively, the second section of the heat exchanger may be larger than the first section of the heat exchanger.

Depending on engine operating conditions, warm or cold EGR may be desired. The exhaust gas may flow through one or both sections of the split heat exchanger 274 in order to achieve different levels of cooling. By adjusting the position of the butterfly valve 276, and an opening of EGR valve 52, flow of exhaust gas through the heat exchanger can be varied. In one example, when desired EGR temperature is higher than a threshold temperature, exhaust gas may flow through the first section 413 of the split heat exchanger 274 before entering the EGR passage 180. In another example, when required EGR temperature is lower than the threshold, exhaust gas may flow in opposite directions through both sections of the split heat exchanger 274 before entering the EGR passage 180. The entrance to the EGR passage 180 may be located in a central region between the two sections of the split heat exchanger 274.

As the exhaust gas passes through one or both sections of the heat exchanger 274, heat from the hot exhaust gas may be transferred to a coolant circulating through both sections of the heat exchanger 274. Upon transfer of heat from the exhaust gas to the coolant, the warmed coolant may be utilized in heating a cylinder head (such as when engine heating is requested) and/or heating a passenger cabin of the vehicle (such as when cabin heating is requested). Alternatively, when there are no heating demands, the warmed coolant may be flowed through a radiator for heat dissipation to the atmosphere.

In this way, engine system 10 may be adapted to provide external, low-pressure (LP) EGR by tapping exhaust gas from downstream of turbine 116. EGR valve 52 may be opened to admit a controlled amount of cooled exhaust gas to the compressor inlet for desirable combustion. EGR valve 52 may also be configured as a continuously variable valve. In an alternate example, however, EGR valve 52 may be configured as an on/off valve. Detailed description of the operation and structure of exhaust bypass assembly 260 will be discussed with relation to FIGS. 4A-4B, 8, 9 and 10. In further embodiments, the engine system may be a naturally aspirated engine without the presence of a turbo-charger and compressor.

FIG. 4A further elaborates the exhaust bypass assembly introduced in FIG. 2 and shows a schematic view of an example embodiment 400 of an exhaust bypass assembly 260. In one example, assembly 260 is an embodiment of assembly 260 of FIG. 2 and therefore may share common features and/or configurations as those already described for bypass assembly 260. Exhaust bypass assembly 260 is fluidly coupled to exhaust passage 302 downstream of an emission control device 170. As discussed in relation to FIG. 2, one or more emission control devices 170 may include one or more exhaust after-treatment catalysts configured to catalytically treat the exhaust flow, and thereby reduce an amount of one or more substances in the exhaust flow.

Exhaust gas flowing from the engine may pass through the emission control device 170 and reach the exhaust bypass assembly 400 located further downstream along the exhaust passage 302. An inlet pipe 410 of the exhaust bypass assembly 400 may be disposed on the exhaust passage 302 at junction 406 (downstream from emission control device 170).

A butterfly valve (valve) 276 maybe coupled to the exhaust passage 302 downstream from the inlet pipe 410. The inlet pipe 410 may lead to a bypass passage 412 which may be parallel to the exhaust passage 302. Depending on the direction of exhaust flow through the exhaust bypass assembly, the butterfly valve 276 may be in open or closed position.

Downstream of the inlet pipe 410, across the butterfly valve 276 the bypass passage 412 may be fitted with a split heat exchanger 274, with two or more sections for cooling exhaust gas flowing through it. The cooling sections of the heat exchanger may be symmetric or asymmetric in design. In this example, the heat exchanger 274 has two symmetric cooling sections 413 and 414 respectively. Depending on the temperature of EGR required, the exhaust gas may pass through one or both sections of the heat exchanger 274. A coolant may be circulated through both sections of heat exchanger 274 for cooling of the exhaust gas before the gas either enters the EGR passage 180 (for delivery to engine intake manifold) or escapes to the atmosphere through tailpipe 335. Coolant does not flow through the intermediate portion 415 between the two sections of the split heat exchanger 274, from where the EGR passage 180 initiates. If faster and more effective cooling is required for the EGR, exhaust gas may flow through both sections of the split Heat exchanger 274. When relatively warmer EGR is required, the exhaust gas may flow through the first section 412 of the split heat exchanger 274. An EGR valve 52 may control the delivery of EGR from the exhaust passage 302 to the passage 328 leading to engine intake manifold.

Upstream of the split heat exchanger 274, the bypass passage 412 ends in an outlet pipe 416 leading back to the exhaust passage 302. The inlet 410 and outlet pipes 416 may be at right angles to the bypass passage 412 and the exhaust passage 302. The outlet pipe 416 joins the exhaust passage 302 at a junction 418 located downstream from the junction 406 and butterfly valve 276. Further downstream, a muffler 172 may be coupled to the exhaust passage 302. After passing through the muffler 172 the exhaust gas may be released to the atmosphere through a tailpipe 335.

By adjusting the position of the valves, the exhaust bypass assembly 400 may be operated in a first or a second operating mode. As such, a first operating mode represents a first setting of the butterfly valve 276 coupled to the main exhaust passage 302 that enables exhaust flow control. In the first operating mode, the butterfly valve 276 may be in open position. It will be appreciated that various functional modes of the engine system may be possible while operating the assembly in the first operating mode, such as by varying the opening of an EGR valve. When in the first operating mode, due to opening of the first butterfly valve 276, a first amount of exhaust gas may flow from junction 406, downstream of the exhaust catalyst 170 into the exhaust bypass via the inlet pipe 410 without flowing through the valve 276. The first amount of exhaust may then flow through the bypass passage 412 and into the first section 413 of the split heat exchanger 274, proximate to the inlet pipe 410. The first amount of exhaust gas may flow in a first direction (from a first end of the heat exchanger proximal to the inlet pipe 410 to the intermediate portion 415 of the split heat exchanger 274) through the first section 413 of the split heat exchanger 274. In the first operating mode, a second amount of exhaust gas may flow from downstream of the exhaust catalyst 170 towards the tailpipe 335 through the valve 276. At junction 406 (upstream of the muffler 172), the exhaust gas may flow into the exhaust bypass via the outlet pipe 416 (used for inlet in this case). The second amount of exhaust may then flow through the bypass passage 412 and into the second section 414 of the heat exchanger 274, proximate to the outlet pipe 416. The second amount of exhaust gas may flow in a second direction (from a second end of the heat exchanger proximal to the outlet pipe 416 to the intermediate portion 415 of the split heat exchanger 274) through the second section 413 of the split heat exchanger 274. The first amount may be adjusted relative to the second amount via adjustments to the butterfly valve 276 coupled in an exhaust passage downstream of an exhaust catalyst 170. Adjustments may be carried out by increasing an opening of the valve 276 to increase the second amount relative to the first amount, and decreasing the opening of the valve to increase the first amount relative to the second amount.

The first and second amounts of the exhaust gas after being cooled by one of the two sections of the split heat exchanger 274, combine at an intermediate portion 415. From the intermediate portion 415, the EGR may flow through the EGR passage 180, the EGR valve 52 and passage 428 before entering the engine intake manifold. A third amount of the exhaust gas may not enter the exhaust bypass assembly through the inlet pipe 410 and the outlet pipe 416 and this portion of exhaust gas may flow downstream through the main exhaust passage 302. This third portion of the exhaust gas may pass through the muffler 172 and exit to the atmosphere uncooled via the tailpipe 335. The first operating mode can be selected when in one or more functional modes, such as a first functional mode where cold EGR is required for engine operations.

In the first functional mode, when cold EGR is required for engine operations, the EGR valve 52 and intake throttle may be held open. The opening of the EGR valve may be increased responsive to an increase in engine load or a decrease in engine temperature, and opening of the EGR valve may be decreased responsive to decrease in engine load or an increase in engine temperature. As exhaust gas flows through both sections of the split heat exchanger 274, exhaust gas may be cooled and the heat from the exhaust gas may be transferred to a coolant. The coolant may be circulated through the heater core of the vehicle and thereafter the recovered heat from the exhaust gas may be utilized for functions such as heating the cylinder head, and warming the passenger cabin, thereby improving engine efficiency. Under circumstances when the heat recovered at the split heat exchanger 274 is not required for heating vehicle components, the heat may be transferred to the radiator for dissipation to atmosphere.

In this way, by using both the sections of the split heat exchanger 274, it is possible to cool the exhaust gas more effectively and to a low temperature. Also, in this operational and functional mode coolant from both the sections of the split heat exchanger 274 may be used to recover heat from the exhaust gas which may be utilized in other vehicle operations. Also, exhaust gas may be delivered from the exhaust passage 302 to engine intake manifold from two takeoff locations on the exhaust passage, thereby improving EGR flow distribution.

FIG. 4B shows a schematic view of an example embodiment of an exhaust bypass assembly 400. The features of the exhaust bypass assembly 400 is described in relation to FIG. 4A. In FIG. 4B, a second operating mode of the exhaust bypass assembly 160 is discussed as compared to the first operating mode discussed in FIG. 4A.

As such, the second operating mode represents a second setting of the butterfly valve 276 that enables exhaust flow control. In the second operating mode, the butterfly valve 276 may be in closed position. Similar to the first operating mode, various functional modes of the engine system may be possible while operating the assembly in the second operating mode.

When in the second operating mode, due to the closing of the butterfly valve 276 the entire exhaust gas may enter the exhaust bypass assembly through the inlet pipe 410 and may continue to the bypass passage 412 and the first cooler section 413 of the split heat exchanger 274. The exhaust gas may flow in the first direction (from a first end of the heat exchanger proximal to the inlet pipe 410 to the intermediate portion 415 of the split heat exchanger 274) through the first section of the split heat exchanger 274. Therefore after passing through the first cooler section 413, warm exhaust gas may enter the EGR passage 180. A part of the exhaust gas may not enter the EGR passage 180 and may pass through both the cooler sections 413 and 414 (in first direction, from first end of the cooler proximal to the inlet pipe 410 to the second end of the cooler proximal to the outlet pipe 416) of the split heat exchanger 274 and exit the exhaust bypass assembly through the outlet pipe 416. Further, this portion of the exhaust gas may pass through the muffler 172 and exit to the atmosphere through the tail pipe 335. The second operating mode can be selected when in one or more functional modes, such as a second functional mode where warm EGR is required for engine operations.

In the second functional mode, warm (cooled to a lesser degree) EGR may be desired for engine operations. Consequently, the EGR valve 52 may be opened, opening of the EGR valve may be increased based on EGR demand. After flowing through the first cooler portion 413 of the split heat exchanger 274, exhaust gas may enter the EGR passage 180 and pass through the EGR valve 52 the passage 428 before entering the engine intake manifold. At the cooler portion 413, heat from the exhaust gas may be transferred to a coolant and as previously described (FIG. 4A), the recovered heat may be transferred (by circulating coolant) to the heater core for further utilization and/or to the radiator for dissipation.

In one example, coolant temperature may be used to determine selection between the two operating modes of the exhaust bypass assembly. If the coolant temperature is above a threshold temperature, first operating mode may not be used as higher cooling load may cause coolant boil. Also, if heat requirement from vehicle cabin and/or other parts of the vehicle is low, second operating mode may be used where less heat is recovered from the EGR (EGR passing through one portion of split heat exchanger 274).

In another example, in a third functional mode, EGR may not be required by the engine e.g., during cold start. In that case depending on coolant temperature and heat requirement by the vehicle (such as cabin heating requirement) the exhaust bypass assembly may be operated in one of first and second operating mode. If coolant temperature is high and/or heat requirement of the vehicle is low, the first operating mode may be used. In the first operating mode, the butterfly valve 276 is in open position and in this case the EGR valve is closed, a large part of the exhaust gas may not enter the exhaust bypass assembly and directly flow downstream towards the tailpipe 335 (for exiting to atmosphere) through the exhaust passage 302. A small part of the exhaust gas may flow into the exhaust bypass assembly through the inlet pipe 410 and pass though both sections of the split heat exchanger 274 before returning to the exhaust passage via the outlet pipe 416. If coolant temperature is low and/or heat requirement of the vehicle is high, the second operating mode may be used. In the second operating mode, the butterfly valve 276 is in closed position and in this case the EGR valve is also closed. The exhaust gas may not flow downstream through the exhaust passage 302 past the closed butterfly valve 276. The entire exhaust gas may flow into the exhaust bypass assembly through the inlet pipe 410 and pass through both sections of the split heat exchanger 274 before returning to the exhaust passage via the outlet pipe 416. In this way heat may be recovered by a coolant at both sections of the split heat exchanger which may be utilized for aforementioned purposes.

Under high load conditions, the butterfly valve 276 on the exhaust passage 302 may be maintained in open position. Under such conditions, due to high back pressure, a large amount exhaust gas may directly exit to atmosphere via the tailpipe 335 without entering the exhaust bypass assembly, thereby preventing coolant boil in the heat exchanger 274.

FIGS. 1, 2, 3A-3B and 4A-4B show example configurations of exhaust bypass assembly with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Figure 5:
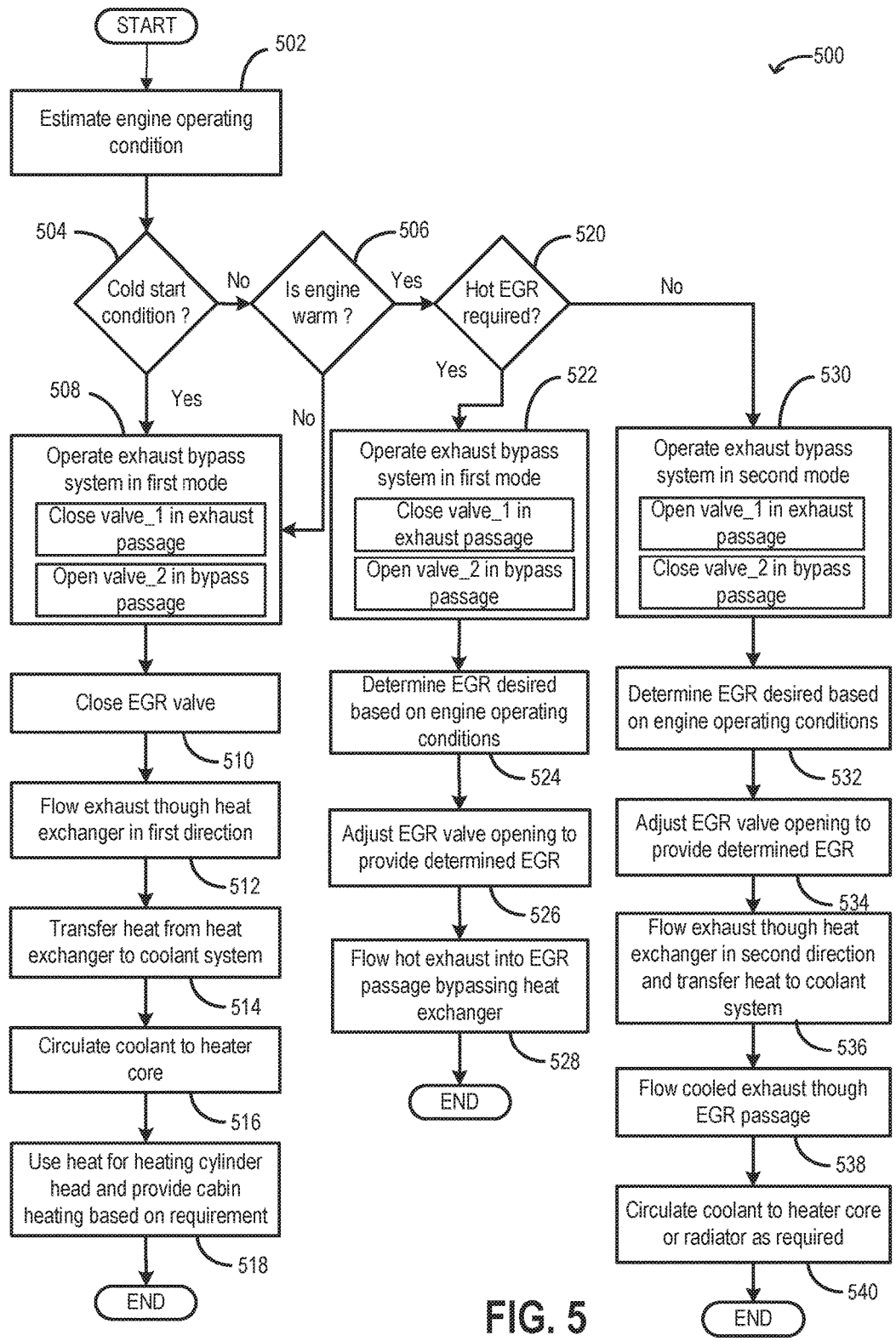
FIG. 5 shows a flow chart illustrating an example method that may be implemented for adjusting exhaust flow through the exhaust bypass assembly of FIG. 1.

FIG. 5 illustrates an example method 500 that may be implemented for adjusting exhaust flow through the exhaust bypass assembly of FIG. 1. Instructions for carrying out method 500 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 502, the routine includes estimating and/or measuring current engine operating conditions. Conditions assessed may include, for example, engine temperature, engine load, engine speed, manifold vacuum, throttle position, exhaust pressure, exhaust air/fuel ratio, etc.

At 504, the routine includes determining if the vehicle engine is operating under cold start conditions. An engine cold-start condition may be confirmed when the engine is started after a prolonged period of engine inactivity, when the engine temperature is lower than a threshold (such as below an exhaust catalyst light-off temperature), and while ambient temperatures are below a threshold.

During cold start conditions, exhaust gas recirculation (EGR) may not be desired by the engine. Thus, if engine cold start conditions are confirmed, the routine moves to 508 in order to operate the exhaust bypass system in the first operating mode. Operating in the first mode, as described in relation to FIG. 3A, includes moving the first butterfly valve or valve_1 (such as first butterfly valve 176 in FIG. 3A) located on the exhaust passage to a closed position while moving the second butterfly valve or valve_2 (such as second butterfly valve 178 in FIG. 3A) located in the bypass passage to an open position. In addition, since EGR is not desired during the engine cold-start, at 510, the EGR valve may be closed, disabling exhaust gas flow from the exhaust passage to the engine intake manifold.

At 512, by setting the exhaust bypass assembly to the first operating mode, exhaust gas may be flowed from downstream of an exhaust catalyst into the exhaust bypass, and then through a first end of the heat exchanger proximate to the exhaust catalyst, to a second end of the heat exchanger, proximate to the tailpipe. Said another way, exhaust gas may enter the exhaust bypass assembly through an inlet (first) pipe (such as pipe 310 in FIG. 3A) and flow through the bypass passage towards a heat exchanger (such as heat exchanger 174 in FIG. 3A), and then on to the atmosphere via the exhaust tailpipe. The exhaust gas may flow through the heat exchanger in a first direction (from a first end of the heat exchanger proximal to the inlet pipe to the second end of the heat exchanger proximal to the outlet pipe). Since the EGR valve is closed, exhaust gas may not flow through an EGR passage towards the engine intake manifold. At 514, waste heat is recovered at the heat exchanger. Specifically, heat from the exhaust gas is transferred to a coolant circulating through the heat exchanger. By transferring the heat from the exhaust gas to the coolant, at a location downstream of the exhaust catalyst, exhaust heat remaining after heating the exhaust catalyst can be advantageously used to warm the coolant circulating through the heat exchanger. As a result, the exhaust gas leaving the heat exchanger is cooled down.

At 516, the coolant warmed via heat transfer at the heat exchanger may be circulated to a heater core so that it can be utilized for heating other components of the vehicle during the engine cold-start, such as a cylinder head, an engine block, and a vehicle cabin space. At 518, the method includes transferring heat from the heater core to one or more vehicle components based on vehicle heating demands. In case of the cold start, the vehicle cabin temperature may be low and cabin heating may be required. Thus, based on cabin heating demand, as requested by a vehicle operator (e.g., based on a cabin temperature setting), heat may be transferred from the heater core to the cabin. For example, air may be drawn into the cabin via the heater core, thereby enabling the cabin to be warmed. After meeting the cabin heating demand, the warmed coolant may also be circulated to an engine block and cylinder head to raise engine temperatures, thereby improving engine performance during cold conditions.

Returning to 506, if cold start conditions are not confirmed, and the vehicle engine is sufficiently warm, the routine moves to 520. At 520, the routine includes determining if hot EGR is desired based on engine operating conditions including engine temperature. In one example, if the engine temperature is above a threshold, it may be determined that hot EGR is desired by the engine. Accordingly, at 522, the exhaust bypass system may be operated in the second operating mode, as described with reference to FIG. 3B. Specifically, the first butterfly valve or valve_1 (such as first butterfly valve 176 in FIG. 3A) located on the exhaust passage may be held in the closed position while the second butterfly valve or valve_2 (such as second butterfly valve 178 in FIG. 3A) located in the bypass passage may be held in the open position.

At 524, the routine includes determining an amount of hot EGR required. The amount of hot EGR desired by the engine may be dependent on engine operating conditions such as engine load, engine temperature, engine speed, etc. Based on the hot EGR requirement, at 526, the method includes adjusting an opening of the EGR valve to admit a controlled amount of hot exhaust gas to the intake manifold for desirable combustion and emissions-control performance. In one example, where the EGR valve is a continuously variable valve, a degree of opening of the valve may be increased. In an alternate example, where the EGR valve is configured as an on/off valve, the EGR valve may be transitioned to an open position. Upon opening the EGR valve, at 528, the method includes flowing exhaust gas from the exhaust manifold into the EGR passage, via the exhaust bypass assembly, upstream of and while bypassing the heat exchanger. In this way low-pressure hot exhaust gas may be delivered from downstream of the turbine in the exhaust passage to the engine intake manifold, without passing through an EGR cooler. It will be appreciated that, based on intake manifold vacuum and exhaust manifold pressure values, a small portion of the exhaust gas may continue downstream through the bypass passage, passing though the heat exchanger, the outlet pipe and exiting to the atmosphere though the tailpipe.

Returning to 520, if hot EGR is not required, it may be inferred that conditions for providing cooled EGR are present. As such, cooled EGR may be provided over a wide range of warmed up engine operating conditions so as to reduce NOx emissions and improve fuel economy. If cooled EGR conditions are confirmed, at 530, the method includes operating the exhaust bypass system in the second operating mode, as described with reference to FIG. 3B. In particular, the first butterfly valve or valve_1 (such as first butterfly valve 176 in FIG. 3B) located in the exhaust passage may be transitioned to an open position while the second butterfly valve or valve_2 (such as second butterfly valve 178 in FIG. 3B) located in the bypass passage may be shifted to a closed position.

At 532, the routine includes determining a cooled LP-EGR requirement of the engine. As an example, the controller may retrieve the value from a look-up table referenced by engine speed and load. Based on the determined EGR requirement of the engine, at 534, the method includes increasing the opening of the EGR valve=to admit a controlled amount of cold exhaust gas to the intake manifold for desirable combustion and emissions-control performance. For example, the controller may send a signal to actuate an actuator coupled to the EGR valve, the actuator moving the EGR valve towards the open position. By operating the exhaust bypass assembly in the second mode, at 536, the method includes flowing exhaust gas from downstream of the exhaust catalyst towards the tailpipe along the main exhaust passage, and then flowing from upstream of the tailpipe exhaust into the second end of the heat exchanger, then through the first end of the heat exchanger to the engine intake via an EGR passage. The exhaust gas may flow downstream through the exhaust passage past the first butterfly valve and enter the exhaust bypass assembly through a second pipe (such as pipe 310 in FIG. 3B) situated downstream from the first pipe. In this example, in the second mode, exhaust gas may be flowed across the heat exchanger in a second direction (from a second end of the heat exchanger proximal to the outlet pipe to the first end of the heat exchanger proximal to the inlet pipe). In this way, depending on operating mode, exhaust gas can flow in both a forward and a backward direction through the heat exchanger. As the exhaust gas passes through the heat exchanger, the heat from the exhaust gas may be transferred to a coolant circulating through the heat exchanger. By transferring the heat from the exhaust gas to the coolant, waste exhaust heat is recovered and can be used to meet other vehicle heating requirements, such as cabin heating.

Opening of the pair of butterfly valves and the EGR valve may be regulated to control the flow of exhaust though the bypass passage and the heat exchanger. A portion of exhaust may not enter the exhaust bypass assembly and may flow downstream through the main exhaust passage and may exit to the atmosphere though the tailpipe.

Since cold EGR is required by the engine, the EGR valve may be maintained in open position. Moving on to 538, after passing through the heat exchanger the cooled exhaust gas may enter the EGR delivery passage leading to the engine intake manifold. In this way low-pressure cold exhaust gas may be delivered from downstream of a turbine in the exhaust passage to the engine intake manifold At 540, the heat recovered by the coolant from the exhaust gas at heat exchanger may be utilized for heating other components of the vehicle. For example, the warmed coolant containing the thermal energy from the exhaust gas may be circulated from the heat exchanger to a vehicle heater core, wherefrom the heat is transferred to air flowing through the heater core for cabin heating. If heat is not required by any component of the vehicle, for example if the vehicle cabin temperature is sufficiently high and there is no further demand for cabin heating, the coolant may be circulated through a vehicle radiator wherefrom the heat may be dissipated to the atmosphere. In this way a single heat exchanger may be used for cooling EGR and extracting heat from exhaust gas.

FIG. 6 is a table 600 showing example modes of operation of the engine and the heat exchange system (exhaust bypass system) of FIG. 1. An engine controller may select one of the operating modes (functional mode) based on engine conditions and heating requirements. Based on the selected operating mode, the position of an exhaust gas recirculation (EGR) valve and dual (coupled) butterfly valves (valve system) may be regulated to control the flow of exhaust gas through a heat exchanger and/or through an EGR delivery passage. The exhaust valve system comprises the dual butterfly valves (as described in FIG. 1) and may be operated in one of first and second modes. In the first valve system mode, the butterfly valve_1 (coupled to the main exhaust passage) may be in closed position and the butterfly valve_2 (coupled to the bypass passage) may be in open position. In the second valve system mode, the butterfly valve_1 may be in open position and the butterfly valve_2 may be in closed position.

In one example, the controller may operate the EGR valve and exhaust valve system in a first engine operating mode such as during a cold start condition when the engine temperature and vehicle temperature is low. During the low engine temperature (below threshold) conditions, EGR may not be required in the intake manifold. Therefore in this mode the EGR valve may be in closed position. In the first engine operating mode, the exhaust valve system may be operated in the first mode with the first butterfly valve (valve_1) closed and the second butterfly valve (valve_2) open. In the first operating mode, exhaust gas from the exhaust passage may enter the exhaust bypass assembly through an inlet (first) pipe and flow through the bypass passage towards a heat exchanger. The exhaust gas may flow in a first direction (from a first end of the heat exchanger proximal to the inlet pipe to the second end of the heat exchanger proximal to the outlet pipe). Since the EGR valve is closed, exhaust gas may flow through the heat exchanger while bypassing an EGR passage. Said another way, flowing exhaust gas in a first direction through the heat exchanger includes exhaust gas entering the Heat exchanger at a first end and exiting at a second, opposite end. The heat from the exhaust gas may be transferred to a coolant circulating through the heat exchanger. After passing through the heat exchanger the exhaust gas may return to the exhaust passage via an outlet (second) pipe and exit to the atmosphere through a tail pipe. Heat recovered from the exhaust gas at the heat exchanger may be circulated through the vehicle heater core for utilization in vehicle components. In one example, heat recovered from the exhaust gas may be used to heat the passenger cabin during such cold start conditions.

In another example, the controller may operate the EGR valve and exhaust valve system in a second engine operating mode when EGR is not required by the engine, such as at high engine load, conditions. During this time, the engine and the vehicle passenger cabin temperature may be high and transfer of heat from the exhaust gas to the heater core may not be required. In this second engine operating mode, the EGR valve may be in maintained in closed position. The valve system may also be operated in the first mode with valve_1 closed and the valve_2 open. Exhaust gas from the exhaust passage may enter the exhaust bypass assembly through the first pipe and flow through the bypass passage towards a heat exchanger. The exhaust gas may flow in the first direction through the heat exchanger. Since EGR is not required by the engine and the EGR valve is closed, exhaust gas may not flow through an EGR passage towards the engine intake manifold. The heat from the exhaust gas may be transferred to a coolant circulating through the heat exchanger. After passing through the heat exchanger the exhaust gas may return to the exhaust passage via a second pipe and exit to the atmosphere through a tail pipe. Since heat is not required in heating of any vehicle component, the coolant containing the heat may be circulated through a vehicle radiator for dissipation to the atmosphere.

In yet another example, the controller may operate the EGR valve and exhaust valve system in a third engine operating mode when hot EGR may be desired for engine operations such as at low engine temperature and low engine load conditions. Therefore in this mode, the EGR valve may be actuated to an open position. The EGR valve opening may be regulated to admit a controlled amount of hot exhaust gas to the intake manifold. The valve system may be operated in the first mode with valve_1 closed and the valve_2 open. Exhaust gas from the exhaust passage may enter the exhaust bypass assembly through the first pipe and flow through the bypass passage towards the entrance of the EGR passage. Depending on the extent of EGR valve opening, a first amount of hot exhaust gas may flow through the EGR passage and the EGR valve towards the engine intake manifold. In this mode, exhaust gas entering the EGR passage (first amount) does not flow through the heat exchanger. Hence, during supply of hot EGR from the exhaust passage to the intake manifold, heat may not be recovered from the first amount of exhaust gas (at the heat exchanger). A second amount of exhaust gas may not enter though the EGR passage and may flow downstream though the heat exchanger (in first direction) before exiting the exhaust bypass assembly. The heat from the second amount of exhaust gas may be transferred to a coolant circulating through the heat exchanger. Depending on requirements, the heat can be either transferred to one of the heater core and the radiator.

In a further example, the controller may operate the EGR valve and exhaust valve system in a fourth engine operating mode when cold EGR may be desired for engine operations such as at high engine temperature and low engine load conditions. Therefore in this mode, the EGR valve may be maintained in open position. The EGR valve opening may be regulated to admit a controlled amount of cold exhaust gas to the intake manifold. The valve system may be operated in the second mode with valve_1 open and the valve_2 closed. The opening of the butterfly valves and the EGR valve may be regulated to determine the amount of exhaust gas entering the bypass assembly compared to the amount of exhaust gas flowing downstream through the main exhaust passage. A first amount of exhaust gas from the exhaust passage may enter the exhaust bypass assembly through the second pipe and flow through the bypass passage towards the heat exchanger. The exhaust gas may flow in a second direction (from a second end of the heat exchanger proximal to the outlet pipe to the first end of the heat exchanger proximal to the inlet pipe) through the heat exchanger. After flowing through the heat exchanger, the cold exhaust gas may flow through the EGR passage and the EGR valve towards the engine intake manifold. The heat from the exhaust gas may be transferred to a coolant circulating through the heat exchanger. Based on demand, heat recovered from the exhaust gas at the heat exchanger may be either circulated through the vehicle heater core for utilization in other vehicle components or transferred to a vehicle radiator for dissipation to atmosphere. A second amount of the exhaust gas may not enter the exhaust bypass assembly but may flow downstream through the exhaust passage towards the tailpipe for exiting to the atmosphere.

In this way, dual butterfly valves may be used to regulate exhaust gas flow in opposite directions through the heat exchanger. A single actuator may be used to control the operation of the dual butterfly valves. A single heat exchanger may be effectively used for EGR cooling and heat recovery of heat from the exhaust gas.

Figure 7:
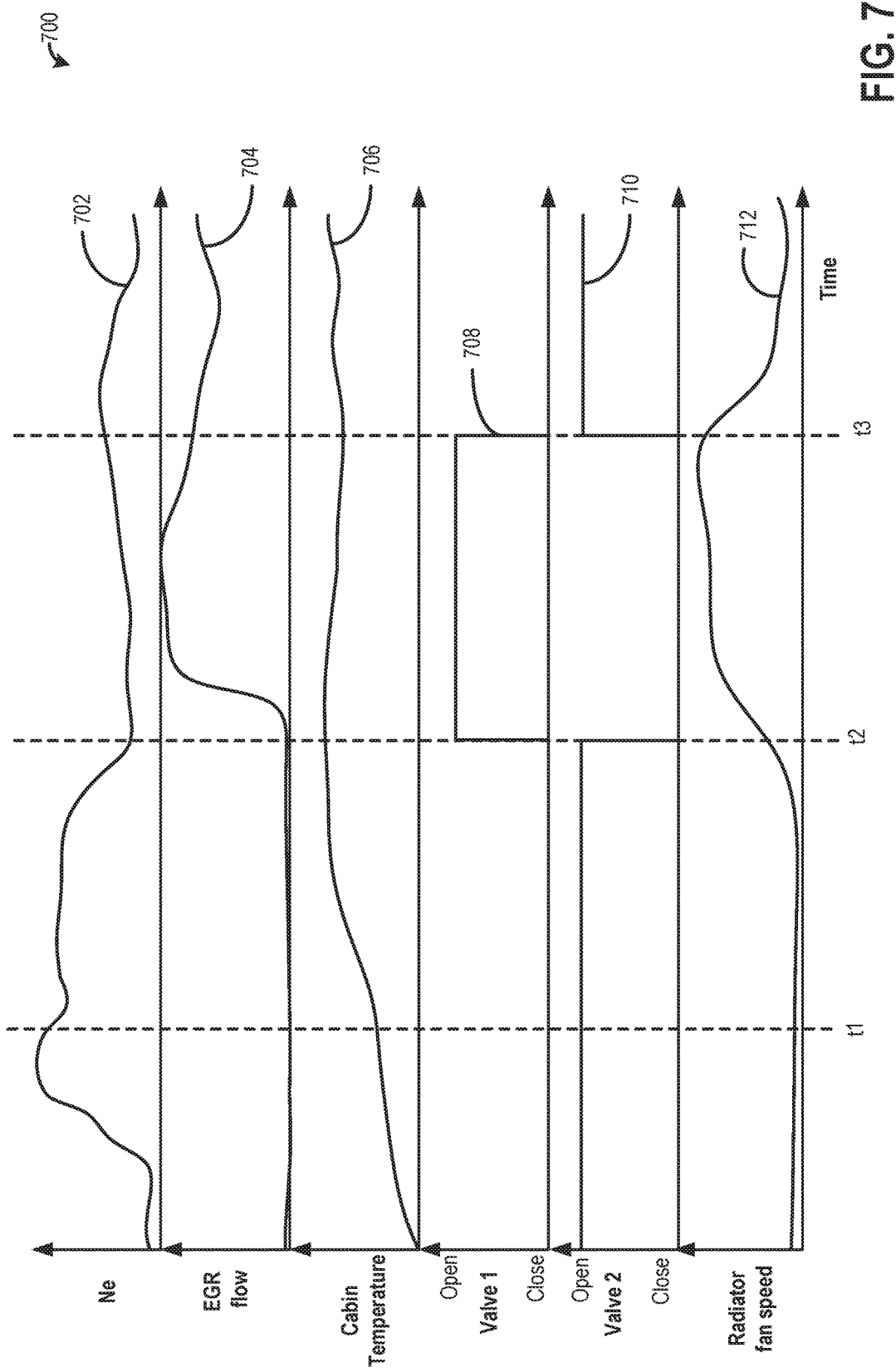
FIG. 7 shows an example operation of the exhaust bypass assembly of FIG. 1.

FIG. 7 shows an example operating sequence 700 illustrating operation of the exhaust bypass assembly of FIG. 1. The direction of exhaust gas flow through a heat exchanger and exhaust gas recirculation (EGR) delivery is determined based on engine operations. The horizontal (x-axis) denotes time and the vertical markers t1-t3 identify significant times in the operation of the exhaust bypass assembly system.

The first plot (line 702) from the top shows variation in engine speed over time. The second plot (line 704) shows EGR requirement by the engine for desired combustion and emissions-control performance. EGR requirement may depend on engine operating conditions e.g. engine load, engine speed, engine temperature etc. The third plot (line 706) shows variation in vehicle cabin temperature over time. The fourth plot (line 708) indicates the opening or closing of a first butterfly valve (valve 1) located on the exhaust passage. The fifth plot (line 710) indicates opening or closing of a second butterfly valve (valve 2) located on the exhaust bypass assembly. The two butterfly valves may be controlled by a single actuator. The sixth and final plot (line 712) shows the variation of radiator fan speed over time. Higher the radiator fan speed, greater is the heat dissipated from the radiator to the atmosphere.

Prior to time t1, the engine starts from rest after a period of inactivity during which the vehicle was not propelled using the engine. The engine may start under cold start conditions with low engine temperature. As seen from the first plot (line 702), as the engine starts, the engine speed is low and the engine speed gradually increases to a steady level. During cold start condition, EGR may not be desired by the engine, thereby plot 704 shows little or no EGR flow from the exhaust passage to the engine intake manifold. As the vehicle starts up, the vehicle cabin temperature may be low as the cabin heating may not have been operational prior to engine start-up. The vehicle cabin temperature may gradually increase over time as heat is supplied to the cabin from the vehicle heater core. During this period, as EGR is not desired for engine operations, valve 1 (butterfly valve coupled to the main exhaust passage) may be maintained in closed state and valve 2 (butterfly valve coupled to the exhaust bypass passage) may be maintained in open state. In this mode (first mode of operation as described in relation to FIG. 3A), exhaust gas from the exhaust passage, after passing through an emission control device may enter an exhaust bypass assembly. The EGR valve is in closed position preventing any exhaust gas from entering the exhaust delivery passage. A heat exchanger may be coupled to an exhaust bypass passage. As the exhaust gas passes through the heat exchanger, heat from the exhaust gas may be transferred from the exhaust gas to a coolant circulating through the heat exchanger. After passing through the heat exchanger, the cooled exhaust gas may exit the exhaust bypass assembly. The exhaust gas may pass through a muffler coupled to the exhaust passage and exit to the atmosphere through an exhaust tailpipe.

The heat recovered from the exhaust gas at the heat exchanger may be utilized for providing heating for the vehicle cabin and/or a plurality of vehicle components e.g. cylinder head. The coolant from the heat exchanger may be circulated from the heat exchanger to the vehicle heater core for utilization in heating different vehicle components. In this example, since prior to t1, the vehicle cabin temperature is low and the heat recovered from the exhaust gas may be utilized in heating the cabin to a comfortable temperature as desired by the user. Heat recovered from the exhaust gas (at the heat exchanger) if not required for heating any vehicle component may also be transferred to the vehicle radiator for dissipation to atmosphere. Since during this time period the vehicle cabin may desire heating, heat recovered from the heat exchanger may be entirely transferred to the heater core for utilization in cabin heating. Little or no heat may be dissipated to the atmosphere via the radiator. Thereby, the radiator fan speed may be low prior to time t1.

After time t1, the engine speed is high and EGR may not be desired by the engine. Thereby, between time t1 and t2, the EGR valve may be maintained in closed position and there may be little or no EGR flow from the exhaust passage to the engine intake manifold. During this time period, valve 1 may be continued to be maintained in closed position and valve 2 may be in open position. As seen for time prior to t1, during this mode, exhaust gas from the exhaust passage may enter an exhaust bypass assembly and flow through a heat exchanger in a first direction (from a first end of the heat exchanger proximal to the inlet pipe to the second end of the heat exchanger proximal to the outlet pipe). Heat from the exhaust gas may be transferred to a coolant circulating through the heat exchanger. After passing through the heat exchanger, the cooled exhaust gas may return to the exhaust passage and may exit to the atmosphere through an exhaust tailpipe.

During this time period, the cabin temperature may not have stabilized to a comfortable level, hence heat may be continued to be required for cabin heating purposes. Heat recovered from the exhaust gas by a coolant at the heat exchanger may be transferred to the heater core for utilization in heating the cabin and/or other vehicle components. During this period, heat recovered at the heat exchanger may be mostly transferred to the heater core (for cabin heating) and not to the radiator (for dissipation to atmosphere) and therefore the radiator fan speed may be low.

Over time, the vehicle cabin temperature may stabilize (line 706) to a level desired by the operator and heat requirement for cabin heating may decrease. In this example, close to time t2, the entire heat recovered from the exhaust gas may not be required by the heater core for heating vehicle components. A significant part of the heat may be transferred to the radiator for dissipation to the atmosphere.

At time t2, there is a decrease in engine speed. This may be due to lower engine load. At this point, cold EGR may be desired by the engine. In order to deliver cold EGR from the exhaust passage to the engine intake manifold, valve 1 may be opened and valve 2 may be closed. In this mode (second mode of operation as described in relation to FIG. 3A), exhaust gas from the exhaust passage, after passing through an emission control device may continue to flow past valve 1 and enter the exhaust bypass assembly downstream of the valve 1. During this time period, between t2 and t3, the EGR valve is in open position. After passing through the heat exchanger in a second direction (from a second end of the heat exchanger proximal to the outlet pipe to the first end of the heat exchanger proximal to the inlet pipe), the cooled exhaust gas may enter the EGR delivery passage through the EGR valve. As seen from plot 704, during this time period, the EGR flow into the intake engine manifold increases. In this way cold EGR may be delivered from the exhaust passage to the engine intake manifold.

During this time, the vehicle cabin temperature has stabilized (line 706) to a level desired by the operator and the entire heat recovered from the exhaust gas (at the heat exchanger) may not be required for cabin heating. The majority of the heat recovered by a coolant from the exhaust gas may be transferred to the radiator for dissipation to atmosphere. Thereby, as seen from line 712, the radiator speed may be high during this time period.

At time t3, the engine speed continues to vary with time. At this stage, based on engine temperature hot EGR may be desired for engine operation. In order to deliver hot EGR from the exhaust passage to the engine intake manifold, the valve 1 may be closed, the valve 2 may be opened and the EGR valve may be maintained in open position. During this mode, exhaust gas from the exhaust passage may enter an exhaust bypass assembly. Instead of flowing through the heat exchanger, the hot exhaust gas may enter the EGR passage passing through the EGR valve and may be delivered to the engine intake manifold. Since hot EGR is required, majority of the exhaust gas is not made to pass through the heat exchanger prior to delivery to the intake manifold. Thereby, substantial amount of heat may be retained in the EGR. During this period, since no heat is transferred to the radiator for dissipation, the radiator fan speed is close to zero.

In this way, depending on engine operating conditions, cold or hot EGR may be delivered from the exhaust passage to the engine intake manifold. Exhaust gas may flow in opposite directions through the heat exchanger and depending on demand, heat recovered from the exhaust gas at the heat exchanger may be either transferred to the vehicle heater core to the radiator. A single cooler may be used to cool EGR and recover the heat energy from the exhaust gas.

Figure 8:
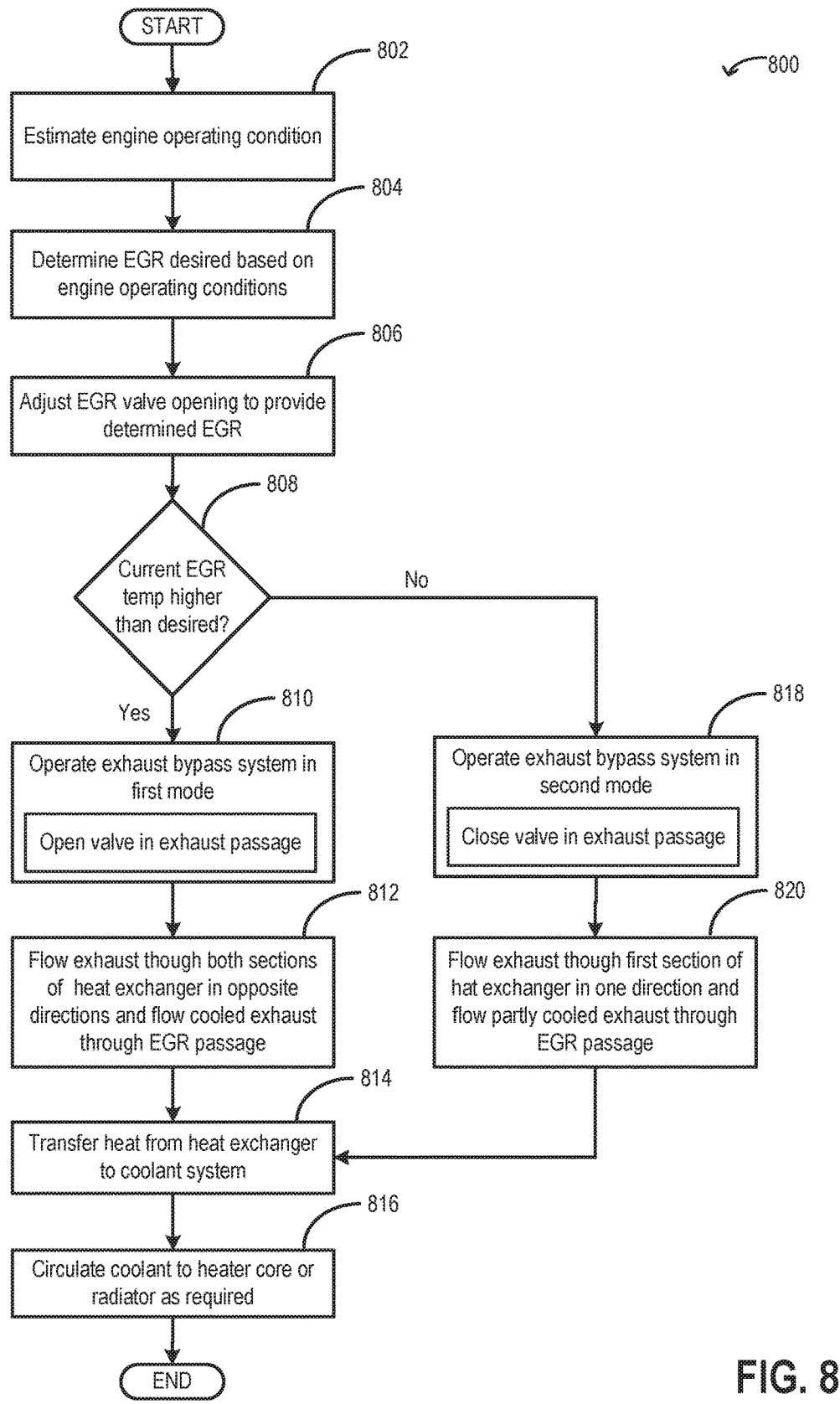
FIG. 8 shows a flow chart illustrating an example method that may be implemented for adjusting exhaust flow through the exhaust bypass assembly of FIG. 2.

FIG. 8 illustrates an example method 800 that may be implemented for flowing exhaust gas recirculation (EGR) through the exhaust bypass assembly of FIG. 2 in a forward or backward direction so as to provide waste heat recovery. At 802, the routine includes estimating and/or measuring current engine operating conditions. Engine conditions assessed may include engine temperature, engine load, engine speed, manifold vacuum, throttle position, exhaust pressure, exhaust air/fuel ratio, etc.

At 804, the routine includes determining EGR requirement by the engine. The amount of EGR desired by the engine may be dependent on engine operating conditions e.g., engine load, engine temperature, engine speed etc. Based on EGR requirement by the engine, at 806, the EGR valve opening may be adjusted to admit a controlled amount of exhaust gas to the intake manifold for desirable combustion and emissions-control performance. EGR valve may be a continuously variable valve. In an alternate example, however, EGR valve may be configured as an on/off valve.

At 808, the routine includes determining the current temperature of the EGR and comparing the current temperature to a desired EGR temperature. Depending on the temperature of the desired EGR, a butterfly valve (such as first butterfly valve 276 in FIG. 4A) regulating the entrance to the exhaust bypass assembly may be opened or closed in order to either flow exhaust gas through both sections of the split heat exchanger for effective and faster cooling of the exhaust gas or flow the exhaust gas through a single portion of the split heat exchanger to partially cool the exhaust gas before delivery to the intake manifold.

If it is determined that the current temperature of the EGR is higher than the desired temperature, the routine moves on to 810, where the exhaust bypass system may be operated in a first operating mode. Operating in the first mode, as described in relation to FIG. 4A, includes moving the butterfly valve (such as first butterfly valve 276 in FIG. 4A) located on the exhaust passage to an open position. At 812, by setting the exhaust bypass assembly to the first operating mode, a first amount of the exhaust gas may be entered into the exhaust bypass assembly through an inlet (first) pipe (such as pipe 410 in FIG. 4A) and flowed through the bypass passage towards a split heat exchanger (such as heat exchanger 274 in FIG. 4A). In this example, the first amount of exhaust gas may flow in a first direction (from a first end of the heat exchanger proximal to the inlet pipe to the intermediate portion of the split heat exchanger) through the first section of the split heat exchanger. As the butterfly valve on the exhaust passage is in open position, a second amount of the exhaust gas may continue downstream along the exhaust passage and may enter the exhaust bypass assembly through a second pipe (such as pipe 416 in FIG. 4A). The second amount of exhaust gas may flow in a second direction (from a second end of the heat exchanger proximal to the outlet pipe to the intermediate portion of the split heat exchanger) through the second section of the split heat exchanger. The first and second amount of exhaust gas may enter the EGR delivery passage from the intermediate section of the split heat exchanger.

In this way the two amounts of the exhaust gas may flow through the split heat exchanger in opposite directions. In the first operating mode, as both the sections of the split heat exchanger are used simultaneously, the exhaust gas is efficiently cooled to a lower temperature before delivery to the engine intake manifold. The opening of the EGR valve and the butterfly valve may regulate the first and second amounts of exhaust gas entering the bypass assembly. A third amount of exhaust gas may not enter the bypass assembly and my flow downstream through the main exhaust passage towards the tailpipe.

At 808, if it is determined that the current temperature of the EGR is lower than the desired EGR temperature, the routine moves on to 818, where the exhaust bypass system may be operated in a second operating mode. Operating in the second mode, as described in relation to FIG. 4B, includes moving the butterfly valve located on the exhaust passage to a closed position. In the second operating mode, since the butterfly valve is in closed position, at 820, the entire volume of exhaust gas may enter the exhaust bypass assembly through the first pipe and flow through the bypass passage towards a split heat exchanger. The entire volume of exhaust gas may flow in the first direction (from a first end of the heat exchanger proximal to the inlet pipe to the intermediate portion of the split heat exchanger) through the first section of the split heat exchanger before entering the EGR delivery passage. Compared to using both sections of the heat exchanger in the first mode, in the second operating mode, the exhaust gas passes through the first half of the split heat exchanger. Hence in the second operating mode, the exhaust gas is cooled to a lower extent compared to the extent of cooling achieved in the first mode, before delivery to the engine intake manifold. Depending on the EGR valve opening, a part of the exhaust gas entering the bypass passage may not enter the EGR delivery passage but rather flow across both sections of the heat exchanger (from left to right) towards the main exhaust passage and to the tailpipe.

At 814, waste heat from the exhaust gas may be recovered at one or both sections of the split heat exchanger. Heat from the exhaust gas is transferred to a coolant circulating through both sections of the heat exchanger. By transferring the heat from the exhaust gas to the coolant, the exhaust gas leaving the split heat exchanger and entering the EGR passage is cooled down.

At 816, the coolant warmed via heat transfer at the heat exchanger may be circulated to a heater core so that it can be utilized for heating other components of the vehicle during the engine cold-start, such as a cylinder head, an engine block, and a vehicle cabin space. If heat is not required by any component of the vehicle, for example if the vehicle cabin temperature is sufficiently high and there is no further demand for cabin heating, the coolant may be circulated through a vehicle radiator wherefrom the heat may be dissipated to the atmosphere. In this way a single split heat exchanger may be used for cooling EGR and extracting heat from exhaust gas.

FIG. 9 is a table 900 showing example modes of operation of the engine and the heat exchange system (exhaust bypass system) of FIG. 2. An engine controller may select one of the operating modes (functional mode) based on engine conditions. Based on the selected operating mode, the position of an exhaust gas recirculation (EGR) valve and the butterfly valve (coupled to the main exhaust passage) may be regulated to control the flow of exhaust gas through one or both sections of a split heat exchanger and/or through an EGR delivery passage.

In one example, the controller may operate the EGR valve and the butterfly in a first engine operating mode when cold EGR may be desired for engine operations such as at high engine temperature and low engine load conditions. In this operating mode, the EGR valve may be in open position and the butterfly valve coupled to the exhaust passage may also be in open position. The EGR valve opening may be regulated to admit a controlled amount of cold exhaust gas to the intake manifold. A first amount of the exhaust gas may enter the exhaust bypass assembly through an inlet (first) pipe and flow through the bypass passage towards a first section of a split heat exchanger. The first amount of exhaust gas may flow in a first direction (from a first end of the heat exchanger proximal to the inlet pipe to the intermediate portion of the split heat exchanger) through the first section of the split heat exchanger. As the butterfly valve on the exhaust passage is open, a second amount of the exhaust gas may continue to flow downstream along the main exhaust passage and may enter the exhaust bypass assembly through a second pipe. The second amount of exhaust gas may flow in a second direction (from a second end of the heat exchanger proximal to the outlet pipe to the intermediate portion of the split heat exchanger) through the second section of the split heat exchanger. The first and second amount of exhaust gas may enter the EGR delivery passage from the intermediate section of the split heat exchanger. In this way the two parts of the exhaust gas may flow through the split heat exchanger in opposite directions. Both sections of the EGR are utilized to effectively cool the exhaust gas to a lower temperature before delivery to the intake manifold. The opening of the EGR valve and the butterfly valve may regulate the first and second amounts of exhaust gas entering the bypass assembly. A third amount of exhaust gas may not enter the bypass assembly and my flow downstream through the main exhaust passage towards the tailpipe.

In another example, the controller may operate the EGR valve and exhaust valve system in a second engine operating mode when, warm (compared to temperature of EGR desired in the first mode) EGR may be desired by for engine operations. In this operating mode, the EGR valve may be maintained in open position and the butterfly valve coupled to the exhaust passage may be actuated to closed position. Consequently, the entire volume of exhaust gas may enter the exhaust bypass assembly through the first pipe and flow through the bypass passage towards the split heat exchanger. The entire volume of exhaust gas may flow in the first direction (from a first end of the heat exchanger proximal to the inlet pipe to the intermediate portion of the split heat exchanger) through the first section of the split heat exchanger before entering the EGR delivery passage. Compared to using both sections of the heat exchanger in the first engine operating mode, in the second operating mode, the exhaust gas passes through the first section of the split Heat exchanger. Hence in the second operating mode, the exhaust gas may be cooled to a lower extent compared to the extent of cooling achieved in the first operating mode, providing warm EGR to the engine intake manifold. Depending on the EGR valve opening, a part of the exhaust gas entering the bypass passage may not enter the EGR delivery passage but rather flow across both sections of the heat exchanger in a first direction (from a first end of the heat exchanger proximal to the inlet pipe to a second end of the heat exchanger proximal to the outlet pipe) and flow towards the main exhaust passage and to the tailpipe.

In yet another example, the controller may operate the EGR valve and exhaust valve system in a third engine operating mode when EGR is not required by the engine, such as during high engine load conditions. In the third operating mode, the EGR valve may be actuated to closed position and the butterfly valve coupled to the exhaust passage may be maintained in closed position. Consequently, the entire volume of exhaust gas may enter the exhaust bypass assembly through the inlet (first) pipe and flow through the bypass passage towards the split heat exchanger. In this example, the entire volume of exhaust gas may flow in a first direction (from a first end of the heat exchanger proximal to the inlet pipe to a second end of the heat exchanger proximal to the outlet pipe) through the both first and second sections of the split heat exchanger before exiting the bypass assembly through the outlet (second) pipe. Since the EGR valve is closed exhaust gas may not enter the EGR delivery passage. The cooled exhaust gas may exit to the atmosphere through the exhaust tail pipe. Alternatively, when EGR is not desired by the engine, the butterfly valve opening may be regulated to control the amount of exhaust gas entering the bypass passage compared to the amount of exhaust gas flowing downstream though the main exhaust passage towards the tailpipe. In case of high load and/or during high coolant temperature at the heat exchanger, a large part of the exhaust gas may be prevented from entering the exhaust bypass thereby preventing coolant boil.

In this way, a single heat exchanger may be effectively used for cooling EGR and for recovery of heat from the exhaust gas. During all three engine operation modes, based on demand, heat recovered from the exhaust gas at the split heat exchanger may be transferred to the vehicle heater core for utilization in other vehicle components. If heat is not required at any vehicle component, heat may be transferred to a vehicle radiator for dissipation.

Figure 10:
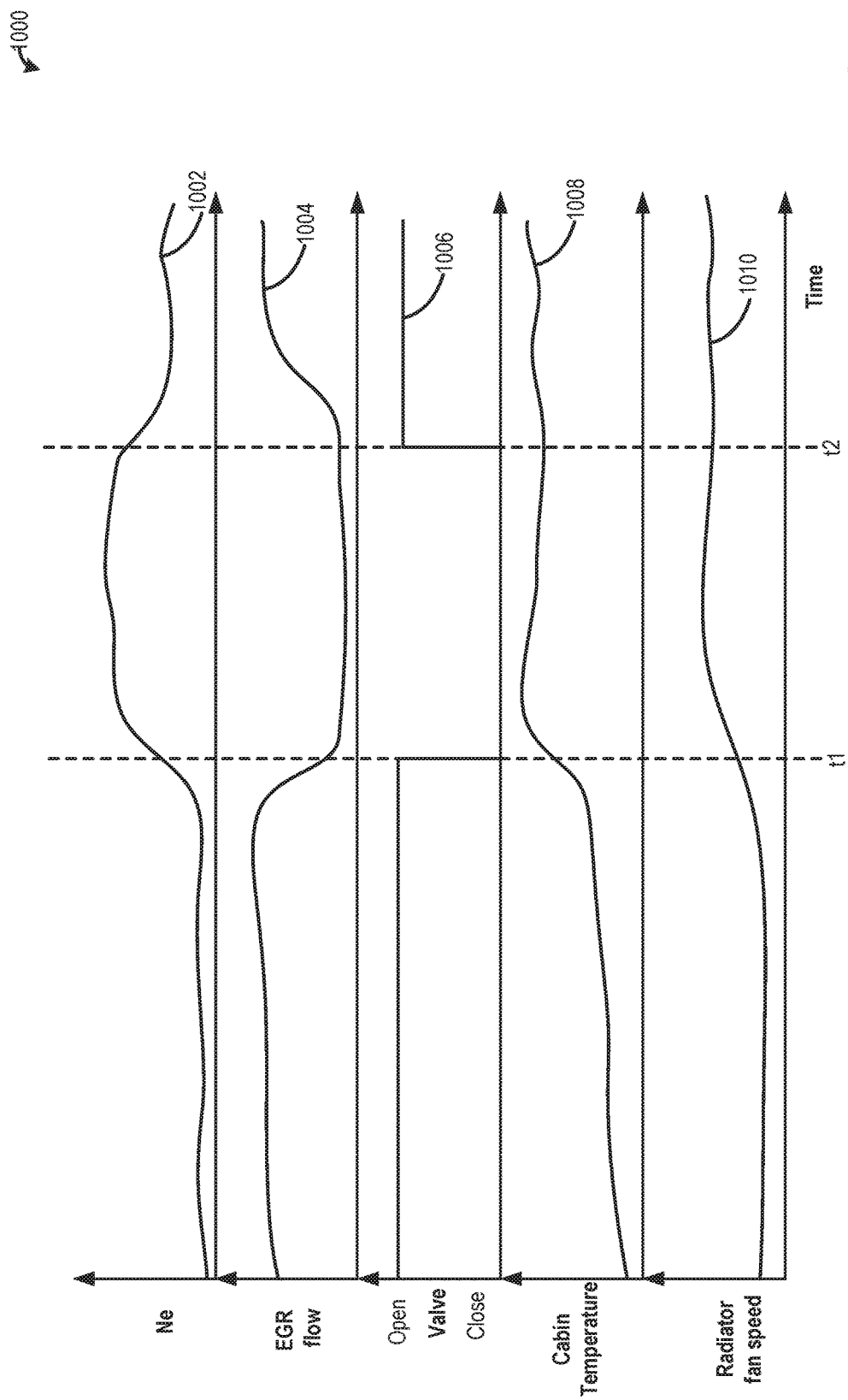
FIG. 10 shows an example operation of the exhaust bypass assembly of FIG. 2.

FIG. 10 shows an example operating sequence 1000 illustrating operation of the heat exchange system of FIG. 2. The direction of exhaust gas flow through the heat exchanger, desired exhaust gas recirculation (EGR) temperature and EGR delivery is determined based on engine operations. The horizontal (x-axis) denotes time and the vertical markers t1 and t2 identify significant times in the operation of the exhaust bypass assembly.

The first plot (line 1002) from the top shows variation in engine speed over time. The second plot (line 1004) shows EGR requirement by the engine for desired combustion and emissions-control performance. EGR requirement may depend on engine operating conditions e.g., engine load, engine speed, engine temperature etc. The third plot (line 1006) indicates the opening or closing of a butterfly valve (valve) located on the exhaust passage. The fourth plot (line 1008) shows variation in vehicle cabin temperature over time. The fifth and final plot (line 1010) shows the variation of radiator fan speed over time. Higher the radiator fan speed, greater is the heat dissipated from the radiator to the atmosphere.

Prior to time t1, the engine speed (as seen from line 1002) is low. During this time period, cold EGR may be desired by the engine. In order to supply cold EGR from the exhaust passage to the engine intake manifold, the butterfly valve on the exhaust passage is maintained in open position. A first amount of the exhaust gas may enter the exhaust bypass assembly through an inlet (first) pipe and flow through the bypass passage towards a left (first) section of a split heat exchanger. The first amount of exhaust gas may flow in a first direction (from a first end of the heat exchanger proximal to the inlet pipe to the intermediate portion of the split heat exchanger) through the first section of the split heat exchanger before entering the EGR delivery passage. A second amount of the exhaust gas may continue downstream along the main exhaust passage and may enter the exhaust bypass assembly through a second pipe. The second amount of exhaust gas may flow in a second direction (from a second end of the heat exchanger proximal to the outlet pipe to the intermediate portion of the split heat exchanger) through the second section of the split heat exchanger before entering the EGR delivery passage. In this way, exhaust gas may be effectively cooled by passing through two sections of the split heat exchanger before entering the intake manifold via the delivery passage. During this time period a steady flow of EGR (plot 1004) is maintained. The opening of the EGR valve and the butterfly valve may regulate the first and second amounts of exhaust gas entering the bypass assembly. A third amount of exhaust gas may not enter the bypass assembly and my flow downstream through the main exhaust passage towards the tailpipe.

Heat may be recovered from the exhaust gas at the two sections of the Heat exchanger using a coolant. Depending on demand, the coolant (with the heat recovered from the exhaust gas) may be circulated either through a vehicle heater core and/or through a radiator. In this example, during this time period, the vehicle cabin temperature may be low and heat recovered from the exhaust gas (at the heat exchanger) may be utilized by the heater core to supply heat to the vehicle cabin. Gradually over time, the cabin temperature may increase and stabilize at a level desired by the operator. Prior to time t1, since majority of the heat recovered at the heat exchanger is utilized in heating vehicle cabin, little or no heat is transferred to the radiator for dissipation to the atmosphere. Thereby, during this time period, the radiator fan speed may be low.

After time t1, the engine speed is seen to increase and EGR is no longer desired for engine operations. To inhibit flow of exhaust gas from the exhaust passage to the intake manifold, the EGR valve is closed. During this time period (between time t1 and t2), the butterfly valve on the exhaust passage is maintained in closed position. Due to closing of the butterfly valve, exhaust gas may not flow downstream along the exhaust passage and the entire volume of exhaust gas enters the exhaust bypass assembly through the first pipe and flow through the bypass passage towards the split heat exchanger. The entire volume of exhaust gas may flow in a first direction (from a first end of the heat exchanger proximal to the inlet pipe to a second end of the heat exchanger proximal to the outlet pipe) through each of the first and second sections of the split heat exchanger before exiting the bypass assembly through the outlet (second) pipe. Since the EGR valve is closed exhaust gas may not enter the EGR delivery passage. The cooled exhaust gas may exit to the atmosphere through the exhaust tail pipe. Heat from the exhaust gas may be recovered by a coolant circulating through both sections of the split heat exchanger. Between time t1 and t2, the vehicle cabin temperature is stable at a level desired by the operator and further cabin heating may not be required. Thereby, majority of the heat from the exhaust gas may be transferred to the radiator for dissipation to atmosphere, causing a rise in radiator fan speed, as seen from line 1010. Alternatively, when EGR is not desired by the engine, the butterfly valve opening may be regulated to control the amount of exhaust gas entering the bypass passage compared to the amount of exhaust gas flowing downstream though the main exhaust passage towards the tailpipe. In case of high load and/or during high coolant temperature at the heat exchanger, a large part of the exhaust gas may be prevented from entering the exhaust bypass thereby preventing coolant boil.

After time t2, the engine speed decreases and EGR may again be de desired for engine operation. During this time period, instead of cold EGR, relatively warm EGR may be desired. The EGR valve may be actuated to open position and the butterfly valve on the exhaust passage may be maintained in closed position. The entire volume of exhaust gas may enter the exhaust bypass assembly through the first pipe and flow through the bypass passage towards the split heat exchanger. The exhaust gas may flow in the first direction (from a first end of the heat exchanger proximal to the inlet pipe to the intermediate portion of the split heat exchanger) through the first section of the split heat exchanger before entering the EGR delivery passage. The exhaust gas is cooled by a single section of the heat exchanger, hence, the exhaust gas may be cooled to a lower extent compared to the extent of cooling achieved using both sections of the heat exchanger. In this way, by regulating the butterfly valve, a steady flow of warm EGR may be maintained from the exhaust passage to the engine intake manifold. Depending on the EGR valve opening, a part of the exhaust gas entering the bypass passage may not enter the EGR delivery passage but rather flow across both sections of the heat exchanger in the first direction and continue towards the main exhaust passage and onto the tailpipe. Also, after time t2, the vehicle cabin temperature may continue to be stable at a level desired by the operator and further heating may not be required. Thereby, majority of the heat from the exhaust gas may be transferred to the radiator for dissipation to the atmosphere and high radiator fan speed may be maintained.

In one example, a method for exhaust gas recirculation comprises operating in a first mode with exhaust gas flowing through an exhaust bypass, and in a first direction through an heat exchanger coupled in the exhaust bypass, and then to an exhaust tailpipe; and operating in a second mode with exhaust flowing through an exhaust passage, then in a second, opposite direction through the heat exchanger, and then to the engine intake. The preceding example method may additionally or optionally further comprise, selecting between the first and second mode based on engine temperature. In any or all of the preceding examples, additionally or optionally, the selecting includes selecting the first mode when the engine temperature is below a threshold, and selecting the second mode when the engine temperature is above the threshold, the threshold based on a catalyst light-off temperature. In any or all of the preceding examples, the flowing exhaust gas in the first direction additionally or optionally includes flowing exhaust from downstream of an exhaust catalyst into the exhaust bypass, and then through a first end of the heat exchanger proximate to the exhaust catalyst, to a second end of the heat exchanger, proximate to the tailpipe, and wherein the flowing exhaust gas in the second direction includes flowing exhaust from downstream of the exhaust catalyst towards the tailpipe, then flowing exhaust from upstream of the tailpipe into the second end of the heat exchanger, then through the first end of the heat exchanger to the engine intake via an EGR passage. In any or all of the preceding examples, additionally or optionally, during the first mode, the EGR valve is closed. Any or all of the preceding examples, additionally or optionally further comprises maintaining operation in the first mode after the engine temperature is above the threshold responsive to a request for hot EGR. Any or all of the preceding examples, additionally or optionally further comprises adjusting an opening of the EGR valve based on the request for hot EGR, the opening increased as the request for hot EGR increases. Any or all of the preceding examples, additionally or optionally further comprises during the first mode, transferring heat from the flowing exhaust gas to the heat exchanger, then from the heat exchanger to coolant flowing through a heater core, and then heating a vehicle cabin by drawing heat from the heater core based on a cabin heating demand. In any or all of the preceding examples, additionally or optionally, during the first operating mode, a first valve coupled downstream of the exhaust catalyst in the exhaust passage is closed and a second valve coupled in the exhaust bypass is open, and wherein during the second mode, the first valve is open and the second valve is closed. In any or all of the preceding examples, additionally or optionally, one or more of the first and second valves are butterfly valves coupled to a common shaft, and wherein the valves are actuated together.

Another example method comprises during an engine cold-start, closing a first valve in an exhaust passage and opening a second valve in an exhaust bypass to flow exhaust in a first direction through an heat exchanger, and transfer heat from the heat exchanger to a vehicle cabin; and after engine warm-up, opening the first valve and closing the second valve to flow exhaust in a second, opposite direction through the heat exchanger, and then recirculate exhaust to an engine intake. In the preceding example method, additionally or optionally, during the engine cold-start, an EGR valve is held closed, and wherein after the engine warm-up, an opening of the EGR valve is increased based on EGR demand. Any or all of the preceding examples, additionally or optionally, further comprises, maintaining the first valve closed and the second valve open until an engine temperature is higher than a threshold, and then opening the first valve and closing the second valve. In any or all of the preceding examples, additionally or optionally, during the engine cold-start, transferring heat from the heat exchanger to the vehicle cabin includes transferring heat from the heat exchanger to a coolant circulating through a heater core, and dissipating heat from the heater core to the vehicle cabin based on cabin heating demand, and wherein after the engine warm-up, heat is transferred from the heat exchanger to a coolant circulating through a radiator, and heat is dissipated from the radiator to atmosphere. In any or all of the preceding examples, additionally or optionally, flowing exhaust in the first direction through the heat exchanger includes flowing exhaust through the heat exchanger while bypassing an EGR passage, and wherein flowing exhaust in the second direction through the heat exchanger includes flowing exhaust into the EGR passage after flowing though the heat exchanger.

In yet another example, an engine system comprises an engine intake manifold; an engine exhaust manifold including an exhaust catalyst and a muffler coupled to each other via each of an exhaust passage and an exhaust bypass, the bypass coupled parallel to the exhaust passage; an heat exchanger coupled in the exhaust bypass; a coolant system fluidly coupled to the heat exchanger and to a heater core; a valve system including a first valve coupled in the exhaust passage and a second valve coupled in the exhaust bypass upstream of a first end of the heat exchanger; a EGR passage coupling the first end of the heat exchanger to the intake manifold, the EGR passage including an EGR valve. An engine system further comprises a controller with computer readable instructions stored on non-transitory memory for: closing the EGR valve and operating the valve system in a first mode with the first valve closed, and the second valve open, to flow exhaust gas from the catalyst to the muffler through the exhaust bypass in a first direction through the heat exchanger; in response to an increase in engine temperature, and a demand for heated EGR, opening the EGR valve while maintaining the valve system in the first mode; and in response to the increase in engine temperature and no demand for heated EGR, maintaining the EGR valve closed while transitioning the valve system to a second mode with the first valve open, and the second valve closed, to flow exhaust gas from the catalyst into the exhaust bypass with exhaust flowing in a second, opposite direction through the heat exchanger, and then flowing exhaust from the heat exchanger to the intake manifold. In the preceding example method, additionally or optionally, the closing the EGR valve and operating the valve system in the first mode is responsive to an engine cold-start condition. In any or all of the preceding examples, additionally or optionally, flowing exhaust gas in the first direction through the heat exchanger includes exhaust gas entering the heat exchanger at the first end and exiting at a second, opposite end, and wherein flowing exhaust gas in the second direction through the heat exchanger includes exhaust gas entering the heat exchanger at the second end and exiting at the first end. In any or all of the preceding examples, additionally or optionally, the first and second valves are butterfly valves, each of the first and second valves coupled on a common shaft and actuated by a common actuator. In any or all of the preceding examples, additionally or optionally, when the valve system is operated in the first mode, heat from the exhaust gas released at the heat exchanger is transferred to engine coolant circulating through a heater core, the heat then transferred to a vehicle cabin, and wherein when the valve system is operated in the second mode, heat from the exhaust gas released at the heat exchanger is transferred to engine coolant circulating through a radiator, the heat then dissipated to atmosphere.

In this way, a single heat exchanger, coupled to an exhaust bypass assembly, may be effectively used as for cooling EGR and for extracting heat from the exhaust gas. By using a single heat exchanger system, cost and component reduction benefits are achieved without limiting the functionality or capability of either system. Additionally, the specific configuration of a single heat exchanger in the exhaust bypass assembly facilitates a shorter EGR passage length thereby reducing EGR transport delay. The technical effect of using a pair of butterfly valves to regulate the passage of exhaust gas through the bypass passage is that exhaust gas can flow in both directions across the heat exchanger. As such this improves the heat transfer efficiency while reducing the requirement of having long EGR passages. The dual butterfly valves may be coupled to a common shaft and may be actuated by using a single actuator. Butterfly valves are robust compared to commonly used gate valves. Since the heat exchanger is located downstream from the catalyst convertor, catalyst functionality is not compromised. Overall, by improving the amount of waste heat that can be recovered from exhaust using fewer components, engine fuel economy and performance may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   operating an engine in a first mode with exhaust gas flowing through an exhaust bypass, and in a first direction through a heat exchanger coupled in the exhaust bypass, and then to an exhaust tailpipe;
   operating the engine in a second mode with a first amount of exhaust gas flowing through an exhaust passage and then to an engine intake and a second amount of exhaust gas flowing in the first direction through the heat exchanger; and
   operating the engine in a third mode with a third amount of exhaust gas flowing through the exhaust bypass, and in a second, opposite direction through the heat exchanger, and then to the engine intake, and a fourth amount of exhaust gas flowing through the exhaust passage to the exhaust tailpipe, wherein during the first and second operating modes, a first valve coupled downstream of an exhaust catalyst in the exhaust passage is closed and a second valve coupled in the exhaust bypass is open, and wherein during the third mode, the first valve is open and the second valve is closed.

2. The method of claim 1, further comprising, selecting between the first, second, and third engine modes based on one or more of engine speed, engine load, engine temperature, and EGR demand.

3. The method of claim 2, wherein the selecting includes selecting the first mode when the engine load is above a threshold load and the engine temperature is below a threshold temperature, selecting the second mode when the engine load is below a threshold load and the engine temperature is below the threshold temperature, and selecting the third mode when the engine load is below the threshold load and the engine temperature is above the threshold, the threshold based on a catalyst light-off temperature, and wherein the selecting includes selecting the first mode responsive to a request for no EGR, selecting the second mode responsive to a request for hot EGR, and selecting the third mode responsive to a request for cold EGR.

4. The method of claim 3, wherein the flowing exhaust gas in the first direction includes flowing exhaust from downstream of the exhaust catalyst into the exhaust bypass, and then through a first end of the heat exchanger proximate the exhaust catalyst, to a second end of the heat exchanger, proximate the tailpipe, and wherein the flowing exhaust gas in the second direction includes flowing exhaust from downstream of the exhaust catalyst towards the tailpipe, then flowing exhaust from upstream of the tailpipe into the second end of the heat exchanger, then through the first end of the heat exchanger to the engine intake via an exhaust gas recirculation (EGR) passage.

5. The method of claim 4, wherein during the first mode, an EGR valve is held closed, and wherein during the second and third modes, an opening of the EGR valve is adjusted based on EGR demand.

6. The method of claim 5, wherein the first, second, third, and fourth amounts of exhaust gas are determined based on the opening of the EGR valve.

7. The method of claim 1, further comprising, transferring heat from the flowing exhaust gas in the first direction to the heat exchanger, then from the heat exchanger to coolant flowing through a heater core, and then heating a vehicle cabin by drawing heat from the heater core based on a cabin heating demand.

8. The method of claim 1, wherein one or more of the first and second valves are butterfly valves coupled to a common shaft, and wherein the valves are actuated together.

9. An engine method, comprising:
   during an engine cold-start, closing an EGR valve, closing a first valve in an exhaust passage, and opening a second valve in an exhaust bypass to flow exhaust in a first direction through a heat exchanger, and transfer heat from the heat exchanger to a vehicle cabin;
   after engine warm-up, opening the EGR valve and:
      during a first condition, maintaining the first valve closed and the second valve open to flow a first portion of exhaust gas through an exhaust passage to an engine intake and a second portion of exhaust gas in the first direction through the heat exchanger and;
      during a second condition, opening the first valve and closing the second valve to flow a third portion of exhaust gas through the exhaust passage to an exhaust tailpipe and a fourth portion of exhaust gas in a second, opposite direction through the heat exchanger, and then recirculate exhaust to the engine intake.

10. The method of claim 9, wherein opening the EGR valve includes adjusting the opening of the EGR valve based on EGR demand.

11. The method of claim 9, wherein the first and second conditions are based on engine temperature.

12. The method of claim 11, further comprising maintaining the first valve closed and the second valve open during the first condition until an engine temperature is higher than a threshold, and then opening the first valve and closing the second valve.

13. The method of claim 9, wherein during the engine cold-start, transferring heat from the heat exchanger to the vehicle cabin includes transferring heat from the heat exchanger to a coolant circulating through a heater core, and dissipating heat from the heater core to the vehicle cabin based on cabin heating demand, and wherein after the engine warm-up, heat is transferred from the heat exchanger to a coolant circulating through a radiator, and heat is dissipated from the radiator to atmosphere.

14. The method of claim 9, wherein flowing exhaust in the first direction through the heat exchanger includes flowing exhaust through the heat exchanger while bypassing an EGR passage, and wherein flowing exhaust in the second direction through the heat exchanger includes flowing exhaust into the EGR passage after flowing though the heat exchanger.

\* \* \* \* \*